US012067028B2

(12) United States Patent
Lusk et al.

(10) Patent No.: US 12,067,028 B2
(45) Date of Patent: *Aug. 20, 2024

(54) STATEFUL DATABASE APPLICATION PROGRAMMING INTERFACE

(71) Applicant: Amazon Technologies, Inc., Seattle, WA (US)

(72) Inventors: Andrew James Lusk, Seattle, WA (US); Eric Jason Brandwine, Haymarket, VA (US)

(73) Assignee: Amazon Technologies, Inc., Seattle, WA (US)

( * ) Notice: Subject to any disclaimer, the term of this patent is extended or adjusted under 35 U.S.C. 154(b) by 10 days.

This patent is subject to a terminal disclaimer.

(21) Appl. No.: 16/779,295

(22) Filed: Jan. 31, 2020

(65) Prior Publication Data

US 2020/0167364 A1 May 28, 2020

Related U.S. Application Data

(63) Continuation of application No. 15/249,972, filed on Aug. 29, 2016, now Pat. No. 10,552,442.

(51) Int. Cl.
*G06F 16/30* (2019.01)
*G06F 9/445* (2018.01)
(Continued)

(52) U.S. Cl.
CPC ............ *G06F 16/258* (2019.01); *G06F 9/445* (2013.01); *G06F 9/541* (2013.01); *G06F 16/25* (2019.01);
(Continued)

(58) Field of Classification Search
CPC ....... G06F 16/258; G06F 16/284; G06F 16/25
See application file for complete search history.

(56) References Cited

U.S. PATENT DOCUMENTS 7,035,846 B2 4/2006 Gupta et al.
8,190,757 B1 5/2012 Davis et al.
(Continued)

OTHER PUBLICATIONS

U.S. Appl. No. 15/250,125, filed Aug. 29, 2016.
U.S. Appl. No. 15/250,362, filed Aug. 29, 2016.

*Primary Examiner* — Khanh B Pham
(74) *Attorney, Agent, or Firm* — Davis Wright Tremaine LLP

(57) ABSTRACT

An application programming interface gateway service generates an application programming interface that, in various examples, allows client applications to access database functionality without maintaining active database connections, managing database credentials, or providing SQL code. The application programming interface maintains state information between invocations that allows for improved database performance. The state information may include SQL statements and subroutines, compiled SQL code, database credentials, active database connections, and connection pools. When invoked by a client application, the application programming interface may select an active database connection from a connection pool based at least in part on the activity history of each connection in the connection pool so that the expected cache performance of the database may be improved. Access to the application programming interface may be controlled via fine-grained access controls independent of the credentials used to access the database.

20 Claims, 18 Drawing Sheets

(51) Int. Cl.
*G06F 9/54* (2006.01)
*G06F 16/25* (2019.01)
*G06F 16/28* (2019.01)
*G06F 21/60* (2013.01)
*H04L 9/40* (2022.01)

(52) U.S. Cl.
CPC .......... *G06F 16/284* (2019.01); *G06F 21/604* (2013.01); *H04L 63/08* (2013.01)

(56) References Cited

U.S. PATENT DOCUMENTS

| | | | |
|---|---|---|---|
| 8,689,218 B1 | 4/2014 | Awad et al. | |
| 9,098,565 B1* | 8/2015 | Kumarjiguda | G06F 16/288 |
| 2003/0014656 A1 | 1/2003 | Ault et al. | |
| 2004/0250252 A1 | 12/2004 | Khartabil | |
| 2005/0262183 A1 | 11/2005 | Colrain et al. | |
| 2006/0200834 A1 | 9/2006 | Cukierman et al. | |
| 2007/0233883 A1 | 10/2007 | De Lutiis et al. | |
| 2008/0178169 A1 | 7/2008 | Grossner et al. | |
| 2008/0313660 A1 | 12/2008 | Malik et al. | |
| 2010/0153530 A1 | 6/2010 | Erickson et al. | |
| 2011/0022941 A1* | 1/2011 | Osborne | G06F 16/367 715/230 |
| 2012/0124647 A1 | 5/2012 | Simula et al. | |
| 2012/0311612 A1 | 12/2012 | Rodriguez et al. | |
| 2013/0066948 A1* | 3/2013 | Colrain | H04L 67/42 709/203 |
| 2013/0152107 A1 | 6/2013 | Ickman et al. | |
| 2014/0081901 A1 | 3/2014 | Szymczak | |
| 2014/0229525 A1 | 8/2014 | Crawford | |
| 2015/0026213 A1* | 1/2015 | Hegde | G06F 16/24552 707/781 |
| 2015/0242531 A1* | 8/2015 | Rodniansky | G06F 21/6218 707/782 |
| 2015/0377639 A1 | 12/2015 | Sofinski et al. | |
| 2016/0012155 A1* | 1/2016 | Shivarudraiah | G06F 16/252 707/769 |
| 2016/0019536 A1 | 1/2016 | Ortiz et al. | |
| 2016/0077897 A1 | 3/2016 | Tsang et al. | |
| 2016/0092173 A1 | 3/2016 | Rodrigues et al. | |
| 2017/0134427 A1* | 5/2017 | Hutchins | G16H 10/60 |
| 2017/0139936 A1* | 5/2017 | Portilla | G06F 16/258 |
| 2018/0025067 A1* | 1/2018 | Tsuchihashi | G06F 16/275 707/610 |
| 2021/0336803 A1* | 10/2021 | Sugihara | H04L 9/30 |
| 2022/0020031 A1* | 1/2022 | Cash | H04L 63/08 |

* cited by examiner

STATEFUL DATABASE APPLICATION PROGRAMMING INTERFACE

CROSS REFERENCE TO RELATED APPLICATION

This application is a continuation of U.S. patent application Ser. No. 15/249,972, filed Aug. 29, 2016, entitled "STATEFUL DATABASE APPLICATION PROGRAMMING INTERFACE." This application also incorporates by reference for all purposes the full disclosure of co-pending U.S. patent application Ser. No. 15/250,125, filed Aug. 29, 2016, entitled "APPLICATION PROGRAMMING INTERFACE STATE MANAGEMENT" and co-pending U.S. patent application Ser. No. 15/250,362, filed Aug. 29, 2016, entitled "CREDENTIAL TRANSLATION."

BACKGROUND

Customers are becoming more reliant on on-demand computing environments where computing resources can be provisioned dynamically. Such computing environments may include virtual computing environments, serverless computing services, and container-based computing environments. When computing resources are created and released dynamically, it can be difficult to maintain state information associated with a customer application. In some dynamically provisioned computing environments, application state may be lost between invocations of a customer function when computing resources are released, and the application state may need to be recreated for successive invocations of the customer function. For example, if the customer function queries a database, a connection to the database may need to be generated each time the customer function is invoked, since the database connection is lost when the computing environment is released upon completion of the customer function. Reconnecting to the database each time the customer function is invoked is expensive and time consuming, and maintaining a connection pool within the application may interfere with the ability to make use of dynamically provisioned computing resources. For at least these reasons, maintaining state information for customer applications running in on-demand computing environments is a difficult problem.

BRIEF DESCRIPTION OF THE DRAWINGS

Various techniques will be described with reference to the drawings, in which.

DETAILED DESCRIPTION

Figure 1:
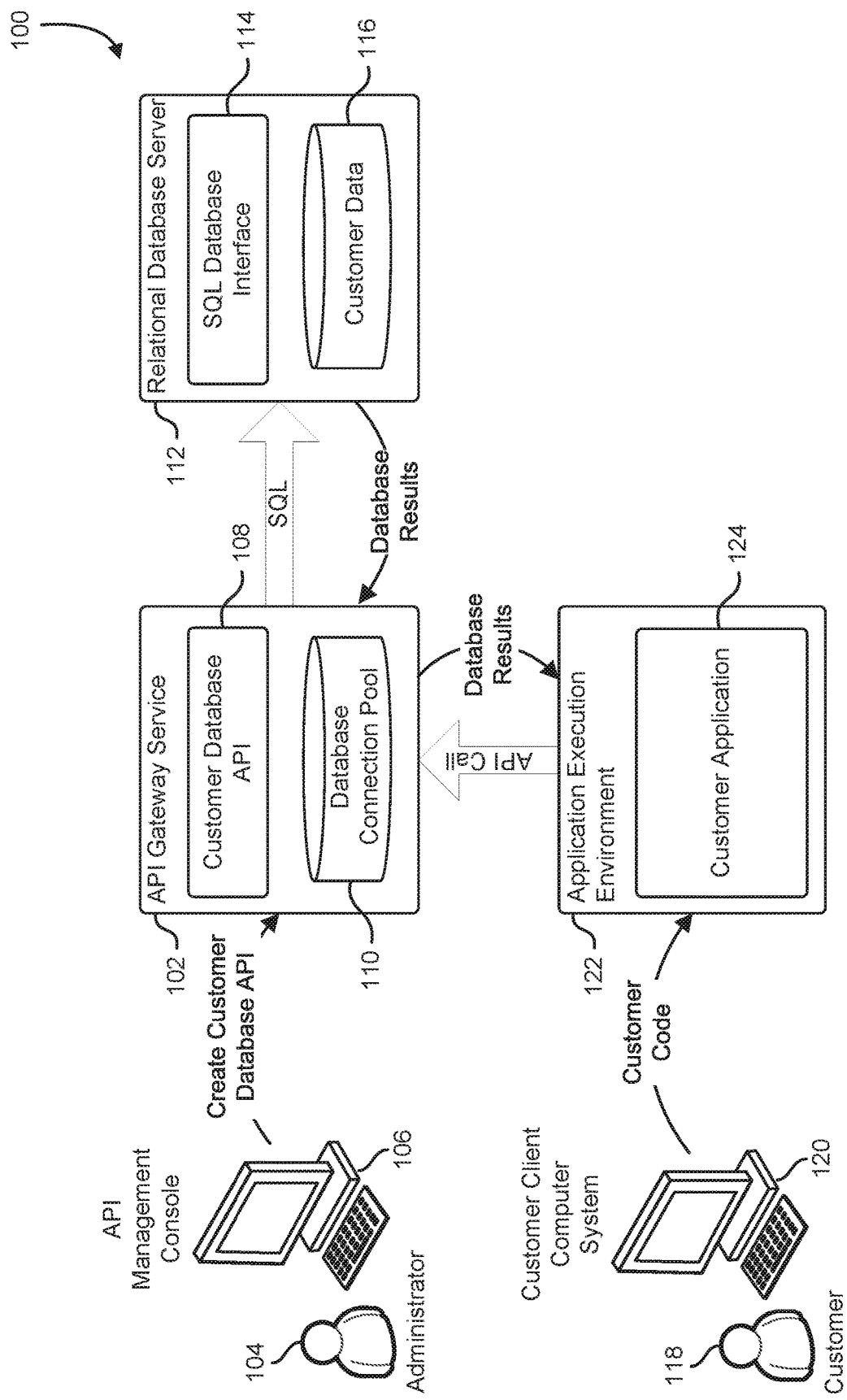
FIG. 1 shows an illustrative example of an environment in which various embodiments may be practiced.

The current document describes an API gateway service that generates and manages application programming interfaces ("APIs") for use by client applications. In various examples, the APIs generated by the API gateway service provide a web-based representational state transfer ("REST") interface to systems such as relational databases, storage services, hardware devices, and cryptographic services. The API gateway service provides state-management capabilities that improve the ability of the APIs to access backend services by facilitating connection pooling for backend services, and by allowing various forms of frontend and backend caching.

An API gateway console interfaces with the API gateway service and allows administrators to generate and manage APIs. Using the API gateway, an administrator may select an existing REST API to be modified, or may generate a new REST API by specifying a name for the new API. The API gateway allows the administrator to specify parameters of an API, as well as to define how those parameters are provided to the API, such as via an HTTP get or post operation. The administrator can specify security settings for the API, as well as throttling parameters and cache settings. Once the API is properly configured, the administrator activates the API on the API gateway service, making the API accessible to client applications.

The API gateway service can be used as an interface to convert backend services that support persistent-connection-based legacy interfaces with coarse security controls, to REST APIs with fine-grained access controls that are compatible with client applications. In one example, the API gateway is used to generate an API that converts relational database operations defined in standard query language ("SQL") into API calls that are accessible as a REST API. To create the API, the administrator uses the API gateway console to specify a relational database server, provide appropriate database credentials, and upload SQL code to the API gateway that implements the desired functionality. The API gateway console generates an API that, when called by a client, establishes a connection to the relational database server, executes the provided SQL code on the relational database server, and returns the results to the client application. The database credentials provided to the API gateway can be a single coarse security control such as a username and password that allows broad access to the database. Access to the API is controlled by a separate set of security parameters specified by the customer via the API gateway console. In this way, sophisticated access controls may be added via the API to legacy backend services that may lack such functionality. By integrating SQL code into the API, Client applications are no longer required to submit SQL code to the database, potentially reducing the risk of SQL injection attacks.

In many implementations, the API gateway service is able to improve the operation of backend services by maintaining, between invocations of the API, state information that is accessible to the API. The API gateway is able to maintain state information in association with particular APIs, particular backend services, particular API clients, or the API gateway itself. Particular APIs are able to access state information that is associated with the particular API, the API client that called the particular API, or the API gateway hosting the API. In one example, the API gateway maintains a connection pool of active connections to a relational database service. When called by a client application, the API queries the API gateway to determine if an active connection is available in the connection pool. If an active connection is not available, the API creates a new connection to the relational database service, performs database operations using the new connection, and adds the new connection to the database pool. If an active connection is available in the connection pool, the API uses the existing connection to perform the database operations, thereby avoiding the overhead of creating a new database connection.

When the API saves state information in the API gateway, the API may specify a storage context for the information. A context may be associated with an entity, actor, or attribute, and defines a scope within which information may be accessed. For example, information describing an active database connection may be retained in a storage context for the entire API gateway so that other clients calling other APIs can make use of the active database connection. The sharing of active database connections can be limited to a particular client by storing the connection pool in a storage context associated with the particular client. If more than one connection pool is accessible to a particular API, the particular API may select an active database connection using a preference order that prefers active connections maintained in a connection pool that is associated with a particular API, followed by active connections maintained in a connection pool that is associated with the client that called the particular API, followed by active connections that are maintained in a connection pool that is associated with the API gateway service.

If more than one active database connection is available within a particular connection pool, a particular connection may be selected from the connection pool based at least in part on similarities between a pending database request to be submitted over the particular connection, and past database requests submitted over the particular connection. For example, a particular database connection may be preferred if recent requests have fulfilled SQL queries from the same table as the pending request. In another example, a particular database connection may be preferred if the API requesting the active connection has used the particular database connection in the recent past. In yet another example, a particular connection is selected from a connection pool to improve the odds that the results of the current request may be in a cache maintained by the backend service.

State information maintained by the API gateway service is not limited to database connection information. In some implementations, an API connects to a backend service via a secure session layer ("SSL") connection. Information identifying the active SSL connection may be maintained by the API gateway so that subsequent calls to the API are able to reuse the active SSL connection without negotiating new cryptographic keys. If the connection information is stored in the appropriate storage context, the active SSL connection may be used by other APIs called by the same client, or by all APIs on the API gateway service. The API gateway service may retain session resumption information so that previous SSL sessions may be resumed using cryptographic keys previously negotiated as part of a previous invocation of the API, a different API, or a different client.

In some examples, the API gateway service maintains state information that provides frontend and backend caching to the APIs hosted by the API gateway service. An administrator may configure frontend caching for an API in part by specifying an expiration time and a size for the frontend cache. As the API receives requests from the client applications, the API gateway service stores the API requests and results in the frontend cache. When a client makes a call to an API, the API gateway service searches the frontend cache and determines whether the cache contains a result that matches the current call. If the cache includes a matching result and the matching result has not expired, the API gateway service returns the matching result without invoking the API. An administrator of an API may configure a frontend cache so that a single cache is shared amongst a plurality of application clients that call a particular API or, alternatively, a separate frontend cache may be maintained for each application client of the particular API.

An API may implement backend caching by in part having the API gateway service maintain the cache information in a storage context corresponding to the sharing context of the backend cache. For example, an API which provides an interface that queries a backend database service may implement a backend cache for the database results by having the API gateway service maintain the cache information within an API storage context. Any application clients calling the API would be able to make use of the backend cache to retrieve database results. Alternatively, an API could maintain a backend cache using a storage context associated with the client so that each client of the API has a separate cache of database results.

FIG. 1 shows an illustrative example of an environment in which various embodiments may be practiced. A system diagram 100 shows a system that includes an API gateway service 102. An administrator 104 configures the API gateway service 102 using an API management console 106. The API management console 106 is a user interface usable by an administrator or other authorized person to create and configure APIs hosted by the API gateway service. In some examples, the API management console 106 is a personal computer system or other client computer system that runs a client application, and the client application configures the API gateway service 102 over a computer network by making calls to a network-based management API. In another example, the API management console 106 is a client computer system running a web browser, and the API gateway service 102 provides a web interface that provides access to management functions. The administrator 104, via the API management console 106, is able to create APIs, modify existing APIs, set security parameters for accessing and using APIs, configure the extent to which APIs and API clients are able to share state information within the API gateway service 102, and other administrative functions.

The APIs created via the API management console 106 and hosted by the API gateway service 102 are active components hosted on computer systems that act as interfaces between client applications and backend services. A client application calls an API, and the API gateway service 102, which hosts the API authenticates the call and invokes the API, providing any parameters or credentials provided by the client application. The API, being an active component operating on a computer system, interprets the call as a request from the client application, and performs operations to manifest the request to a backend service. The API may generate a return value based at least in part on responses received from the backend service, and provides the return value to the client application. An API may be called by submitting a web service request, a remote procedure call, or local procedure call to the computer system hosting the API.

In the example shown in FIG. 1, the API gateway service 102 hosts a customer database API 108 with an associated database connection pool 110. The customer database API 108 provides an interface that complies with the API gateway service 102. In some implementations, the API gateway service 102 exposes the customer database API 108 in compliance with the REST API model, and provides access controls to the customer database API 108 that are compatible with frontend customer clients and systems. As part of fulfilling an API request, the customer database API 108 acquires and submits SQL code to a relational database server 112. The SQL code is submitted via a database connection such as an ODBC, JDBC, OLE-DB, or database-specific connection. An SQL database interface 114 on the relational database server 112 receives and processes the SQL code, and generates database results from customer data 116. The database results are returned to the customer database API 108.

In some implementations, active connections to the relational database server 112 are maintained within the database connection pool 110 between calls to the customer database API 108. The database connection pool 110 may be maintained in a number of different storage contexts. In some examples, the information in the database connection pool 110 is accessible only to the customer database API 108. In another example, the information in the database connection pool 110 is accessible to any API hosted by the API gateway service 102. In yet another example, information in the database connection pool 110 is accessible to all APIs hosted by the API gateway service 102. The API gateway service 102 may maintain multiple database connection pools which may be accessible to a particular customer database API. During a particular call to the customer database API 108, the customer database API 108 may select a database connection by preferring active connections associated with the customer, followed by active connections associated with the customer database API 108, followed by active connections accessible to all APIs hosted by the API gateway service 102.

Performance may be improved in some implementations by maintaining a history of database requests submitted with each active database connection. When the customer database API 108 selects an active database connection from one or more database connection pools, each active database connection is examined and an active database connection is selected based on similarities between past database requests submitted via the active connection, and the current database request. By selecting an active connection that has recently processed similar requests, the chances of fulfilling the request using cached information maintained by the relational database server 112 may be increased.

The frontend interface of the customer database API 108 can be accessed from a variety of application execution environments. In the example shown in FIG. 1, a customer 118 uses a client computer system 120 to upload client-application code and any necessary credentials into an application execution environment 122. The application execution environment may be a virtual computing environment, a remote server, a remote server cluster, a serverless application environment, or other application execution environment. The application execution environment 122 hosts a customer application 124 which makes API calls to the customer database API 108.

When the customer application 124 makes an API call to the customer database API 108, the customer application 124 identifies the customer database API 108, provides parameters to the customer database API 108, and supplies credentials supplied by the customer 118. The API gateway service 102 processes the credentials and authorizes the API call. The customer database API 108 queries the API gateway service 102 for active connections. In some implementations, the API gateway service 102 searches a database connection pool associated with the API gateway service 102, a database connection pool associated with the customer database API 108, and a database connection pool associated with the customer 118 identified using the credentials provided by the customer application 124. If an active database connection is available, the active database connection is provided to the customer database API 108. If an active database connection is not available, a new database connection is created to the relational database server 112. The customer database API 108 generates SQL code to fulfill the API request, and submits the SQL code to the relational database server 112. The relational database server 112 processes the SQL code and returns the database results over the database connection. The selected database connection is returned to the database connection pool 110. In some implementations, the request is logged in association with the selected connection to improve the selection of database connections when processing future requests. The customer database API 108 formats the results returned by the relational database server 112 to comply with the API supported by the API gateway service 102, and returns the results to the customer application 124. In many implementations, the customer application 124 does not submit SQL code to the API gateway service 102, thereby reducing the risk of a SQL injection attack. Since the customer application 124 does not, in general, manage the pooling of database connections, the application execution environment 122 may be a stateless execution environment, or a reduced-state execution environment.

Figure 2:
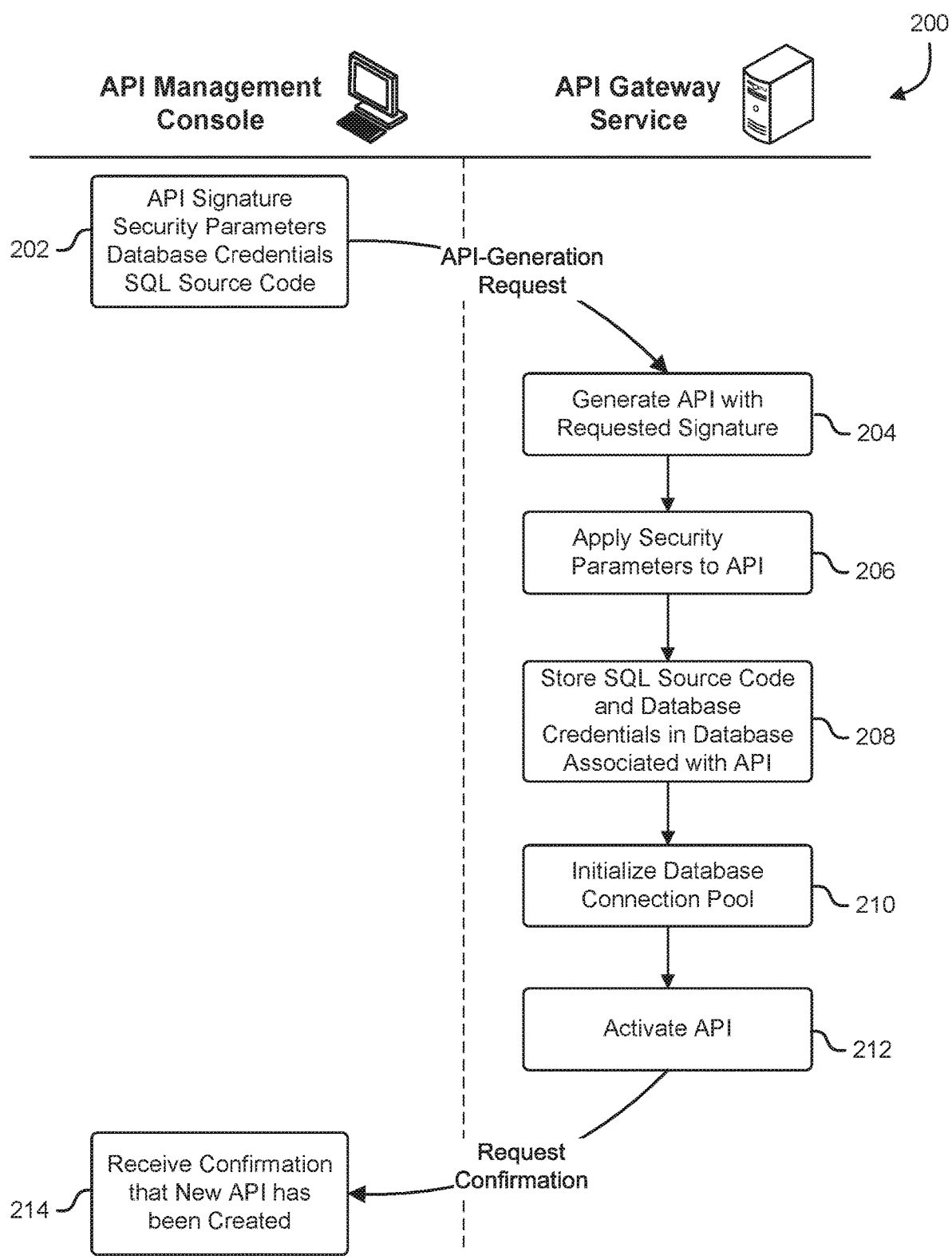
FIG. 2 shows an illustrative example of a process that, as a result of being performed by an application programming interface ("API") management console and an API gateway service, creates a new API hosted by the API gateway service.

FIG. 2 shows an illustrative example of a process that, as a result of being performed by an API management console and an API gateway service, creates a new API hosted by the API gateway service. A swim diagram 200 illustrates a process that begins at block 202 with an administrator using the API management console to provide, to the API gateway service, information that specifies the configuration of the new API. The information may include a name, identifier, URL, or a portion of a URL that identifies the new API. The administrator may specify a parameter signature for the API. For example, the administrator may specify that the new API takes three parameters, the first two parameters being integers, and the third parameter being a string. The administrator may secure the API by specifying security parameters and access controls that limit the clients which have access to the API. The security parameters may specify security roles, security group membership, or specific credentials that are required to access the API.

Using the API management console, the administrator provides the API gateway service with executable code, data, and backend credentials that implement the new API. The executable code may be in the form of SQL source code, source or binary instructions, Java, compiled intermediate language, or other instructions. In the example shown in FIG. 2, the administrator provides the API gateway service with database credentials and SQL source code that, when executed, connects to a backend database and retrieves information that is then returned via the new API.

At block 204, the API gateway service receives the information from the API management console and generates a new API endpoint with the requested parameter signature and identifier. In some examples, the API management console does not provide the API gateway service with an identifier, and the API gateway service generates an identifier for the new API which is returned to the API management console. At block 206, the API gateway service applies the security parameters specified by the API management console to the new API. The security parameters may be applied by saving the security information in the API gateway service. When an API client attempts to call the new API, the API gateway service authenticates the credentials provided by the caller and confirms that the caller is allowed to access the new API using the stored security information. At block 208, the API gateway service stores the executable code provided by the administrator, as well as any data and credentials provided for backend services. Credentials for backend services which are provided by the administrator may be stored separately from the data and the executable code, such as in a hardware security module ("HSM"). In some implementations, the credentials may be used, but not read by the APIs hosted by the API gateway service.

At block 210, the API gateway service initializes storage space for the new API that includes a database connection pool. The database connection pool may be maintained in a storage context that is accessible only to the new API, accessible to all APIs hosted by the API gateway service, or accessible to clients that provide a particular credential or that have a particular security role. The API gateway service may generate one or more active database connections, and place the active database connections into the database connection pool. In some implementations, the API gateway service is provided with initialization code from the administrator. The API gateway service executes the initialization code which creates one or more active database connections to the backend database, and the active database connections are placed into the database connection pool.

The API gateway service activates 212 the newly configured API, making it available to API clients. The API gateway service returns the status of the API-generation request to the administrator via the API management console. The status may include the identifier used for the new API if one was not provided as part of the API-generation request. After the API management console receives 214 confirmation that the new API has been created, the administrator may provide information that identifies the API to customers for integration into client applications.

Figure 3:
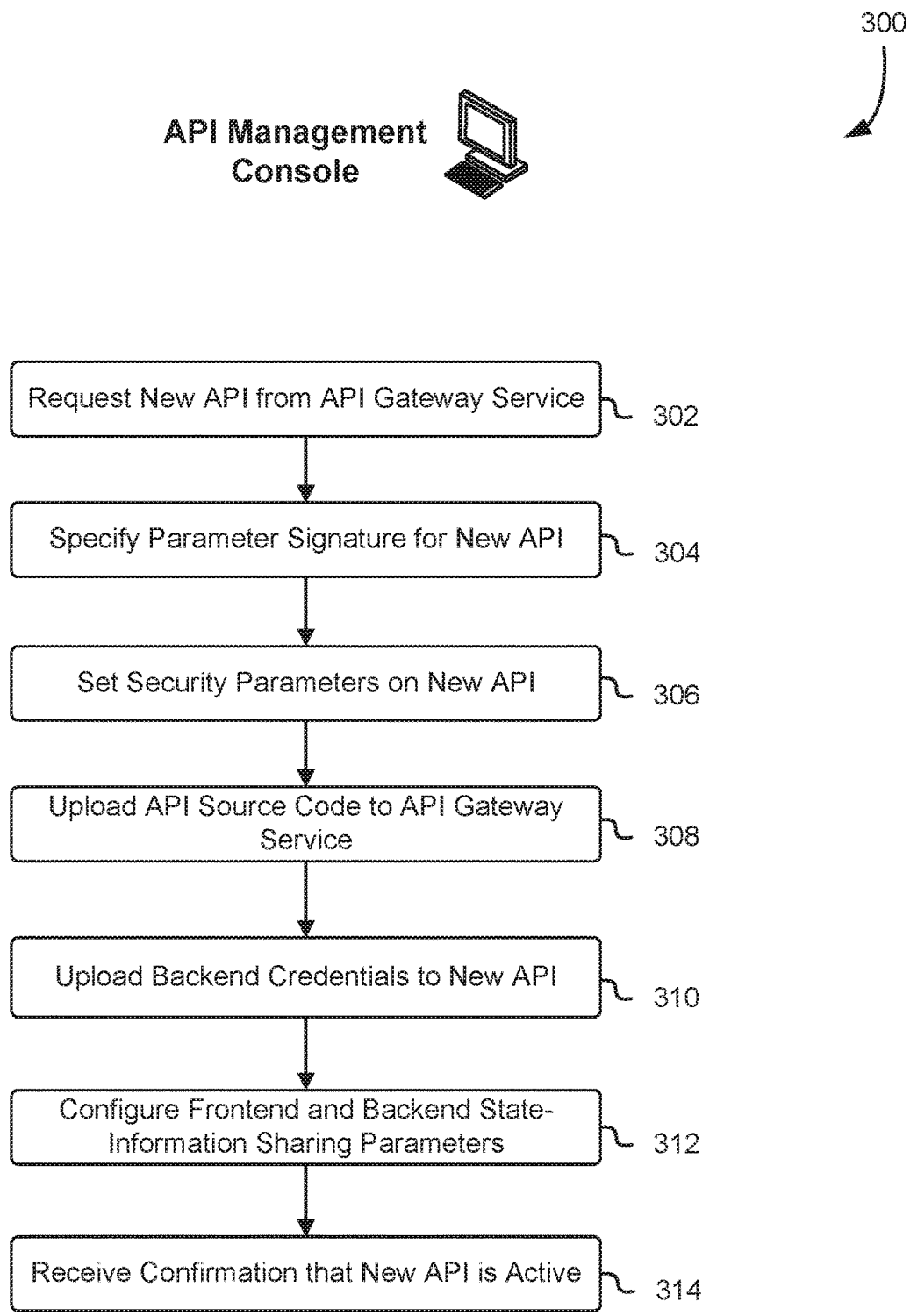
FIG. 3 shows an illustrative example of a process that, as a result of being performed by an API management console, requests creation of a new API from an API gateway service.

FIG. 3 shows an illustrative example of a process that, as a result of being performed by an API management console, requests creation of a new API from an API gateway service. A flowchart 300 illustrates a process that begins at block 302 with the API management console requesting generation of a new API from the API gateway service. The request may specify an identifier, such as a name, URL, or address that is to be associated with the new API. Alternatively, the API gateway may generate an identifier for the new API, and return the generated identifier to the API management console. At block 304, the API management console specifies a parameter signature for the new API. The parameter signature may specify a number and type of parameters, as well as specifying how each parameter is transmitted to the API. For example, the API management console may specify whether a particular parameter is supplied to the API via a get or post operation. At block 306, the API management console sets the security parameters for the new API. In some examples, the API management console specifies one or more security roles necessary to access the API. In another example, the API management console specifies a finite collection of credentials that must be provided to call the API. In yet another example the API management console identifies one or more digital certificates or digital signatures that must be provided to access the API.

The API management console uploads 308 API source code to the API gateway service. The API source code is used by the API gateway service to implement the API. In some examples, the source code is SQL source code that is executed by the API gateway service using a remote relational database service. In addition to API source code, the API management console provides 310 credentials for any backend services accessed by the API. If the API is provided with SQL that is to be executed on a relational database service, the API management console provides 310 the API gateway with credentials to access the relational database service. The credentials provided by the API management console for accessing the relational database service may be different from the credentials authorized to access the API hosted by the API gateway service. In some examples, the credentials provided by the API management console for accessing the relational database may provide broad access to the relational database service, and the range of allowable operations on the relational database services restricted by the capabilities of the new API.

At block 312, the API management console configures frontend and backend state-information-sharing parameters. The API gateway service can maintain state information for APIs hosted by the API gateway service. The state information may be shared between APIs, or between different API clients, subject to limitations configured through the API management console. For example, the API management console may be used to configure a frontend cache for the new API. The frontend cache may be used to store API requests and corresponding results. Repeated requests submitted within an expiration time may be fulfilled from the cache. Use of the cache may be restricted to a single application client, or maybe shared across all application clients based at least in part on state-information-sharing parameters configured by the API management console. Backend state information includes connection pools for backend services, and caches maintained for backend services.

At block 314, the API management console receives confirmation that the new API has been created and is active. If the API gateway service generated an identifier for accessing the new API, the identifier is returned to the API management console.

Figure 4:
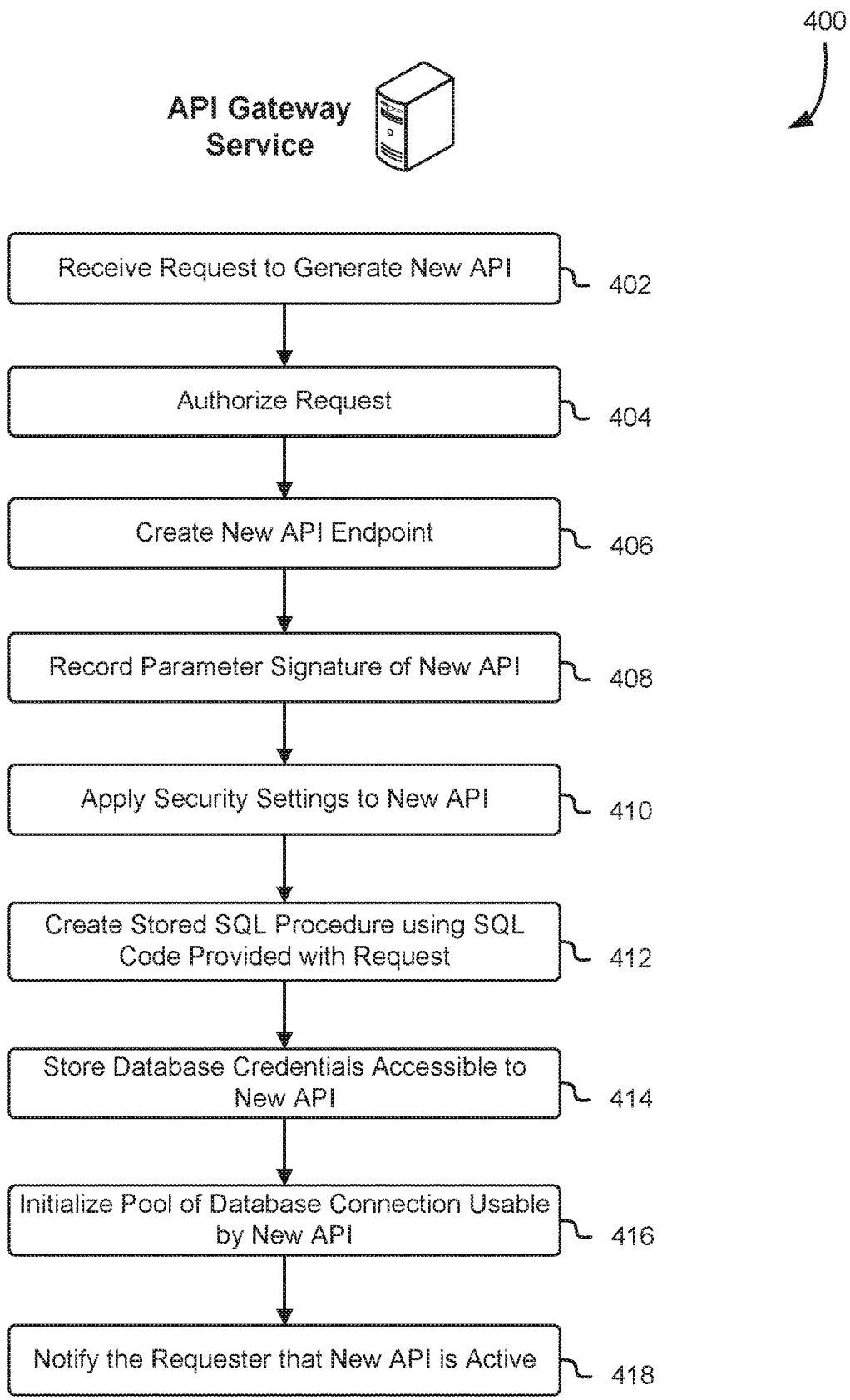
FIG. 4 shows an illustrative example of a process that, as a result of being performed by an API gateway service, generates a new API in response to a request from an API management console.

FIG. 4 shows an illustrative example of a process that, as a result of being performed by an API gateway service, generates a new API in response to a request from an API management console. A flowchart 400 shows a process that begins at 402 with an API gateway service receiving a request to generate a new API. The request may include an identifier for the requested API, parameters expected by the API, security parameters for the API, state sharing information for the API, and executable code in credentials used to access backend services. At block 404, the API gateway authenticates the request and confirms that the requester has authority to generate a new API. If the requester has authority to generate a new API, execution proceeds to block 406 and the API gateway service generates a new API endpoint. If the request includes an identifier for the new API, the API gateway service confirms that the identifier does not conflict with other identifiers used by existing APIs. If the identifier provided with the API request conflicts with an existing APL or if an identifier was not provided, the API gateway service generates a new identifier for the new API. In some examples, the API gateway generates a new identifier by generating a URL for the new service that includes a random sequence of characters.

At block 408, the API gateway service records the parameter signature of the new API. The parameter signature information includes the number and type of parameters, and may include information describing how the parameters are provided to the new API. In some implementations, the API gateway generates stub code for the new API that retrieves the expected parameters and validates that the correct number and type of parameters are received. The API gateway applies 410 security settings to the API that limit access to the API based on credentials provided by client applications. The API gateway may limit access to the API based on selected credentials, security roles, or credential properties.

The API gateway service implements the new API using source code and credentials provided as part of the request to generate the new API. In the example shown in FIG. 4, the API gateway service creates 412 a stored SQL procedure on a remote relational database server using SQL code provided with the request. In another example, the API gateway server stores the SQL code on the API gateway service, and provides the SQL code to the relational database server as part of each invocation of the new API. The API gateway service stores 414 credentials for the relational database server in a location accessible to the API. In some implementations, credentials for the relational database server are maintained in an HSM, and APIs managed by the API gateway service are not allowed to read the credentials from the HSM.

At block 416, the API gateway service initializes a pool of database connections that are usable by the API. In some implementations, the API gateway service generates one or more active database connections as part of creating the new API, and adds the active database connections to the connection pool. Based on sharing parameters specified by the API management console, the connection pool may be shared across the number of APIs, or a number of client applications. Once the new API is fully configured, the API gateway service notifies 418 the requester that the API is active, and makes the API available to client applications.

Figure 5:
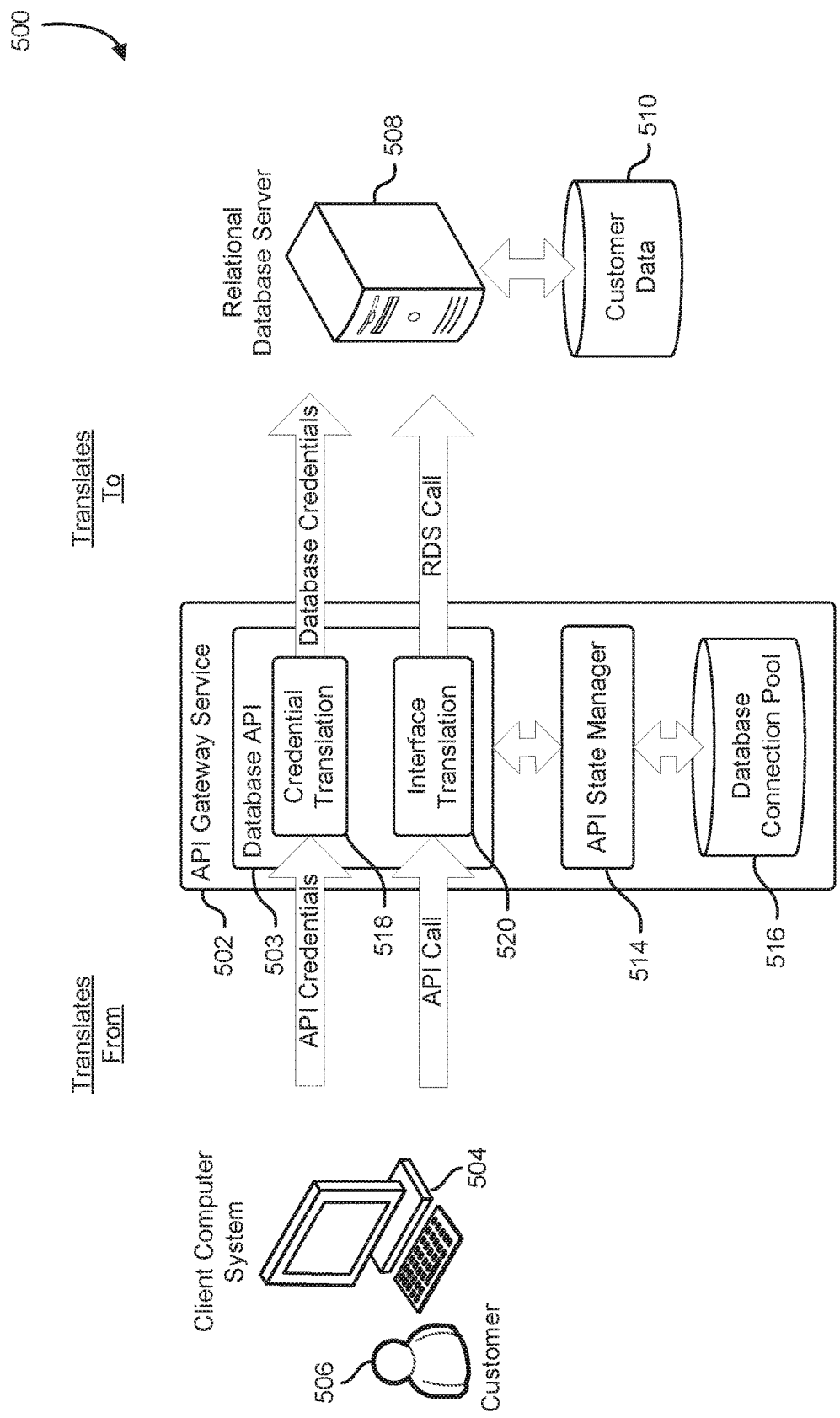
FIG. 5 shows an illustrative example of an API gateway service that translates calls made by a client application to a RESTful database API, into a set of relational database instructions that are submitted over a database connection to a relational database server.

FIG. 5 shows an illustrative example of an API gateway service that translates calls made by a client application to a RESTful database API, into a set of relational-database instructions that are submitted over a database connection to a relational database server. A system diagram 500 includes an API gateway service 502 that hosts a database API 503 called by a client application hosted by a client computer system 504 and operated by a customer 506. The database API 503 hosted by the API gateway service 502 submits SQL instructions to a relational database server 508. The SQL instructions are executed by the relational database server 508 and operate on customer data 510 to produce results which are returned to the API gateway service 502.

The API gateway service 502 includes an API state manager 514. The API state manager 514 maintains a database connection pool 516 that holds information identifying a number of active database connections between the API gateway service 502 and the relational database server 508. The active database connections are made available to the database API 503 for submitting the SQL instructions to the relational database server 508. By using active database connections provisioned from the database connection pool 516, the database API 503 may avoid the overhead associated with generating a new connection to the relational database server 508 for each invocation of the database API by the client application. Database connections used by the database API 503 are returned to the database connection pool 516 via the API state manager 514 after each invocation of the database API 503 is concluded.

The database API 503 includes credential translation logic 518 and interface translation logic 520. When the client application running on the client computer system 504 invokes the database API 503, the client application provides a set of API credentials to the database API 503. The API credentials are used by the API gateway service 502 to identify and authenticate the client application running on the client computer system 504. The API gateway service 502 maintains a list of access controls associated with the database API 503 and, using the API credentials supplied by the client application, determines whether the client application is authorized to invoke the database API 503. The API credentials may take the form of a username and password, digital certificate, cryptographic key, or signed security token. The access controls may specify a set of security policies, security roles, or a set of permissions granted to the API credential as a requirement for invoking the database API 503.

Using the API credentials, the credential translation logic 518 acquires a set of database credentials for use in accessing the relational database server 508. In some examples, the credential translation logic 518 accesses a credential-translation table that links a particular API credential to one or more database credentials that may be used by the database API 503. The credential-translation table is maintained by the API gateway service 502. In some implementations, the API gateway service 502 makes the credential-translation table available to multiple APIs hosted by the API gateway service so that credentials may be managed centrally by the API gateway service 502.

In some examples, SQL code is provided by an administrator when the database API 503 is created. The interface translation logic 520 acquires an active connection to the relational database server, and causes the SQL code to be executed by the relational database server either by sending the SQL code to the relational database server 508 or by executing a stored procedure containing the SQL code on the relational database server 508. In another example, a client application submits SQL code to the database API 503, and the interface translation logic 520 forwards the provided SQL code to the relational database server 508 for execution. In yet another example, the database API 503 accepts an enumerated parameter. The enumerated parameter corresponds to a selection from a number of predefined SQL routines provided by an administrator when the database API 503 is created. The interface translation logic 520 selects a particular predefined SQL routine based at least in part on the enumerated parameter, and provides the particular predefined SQL routine to the relational database server 508 for execution. In some implementations, the predefined SQL routines are loaded onto the relational database server 508 as a number of precompiled functions that can be executed by name by the interface translation logic 520.

Figure 6:
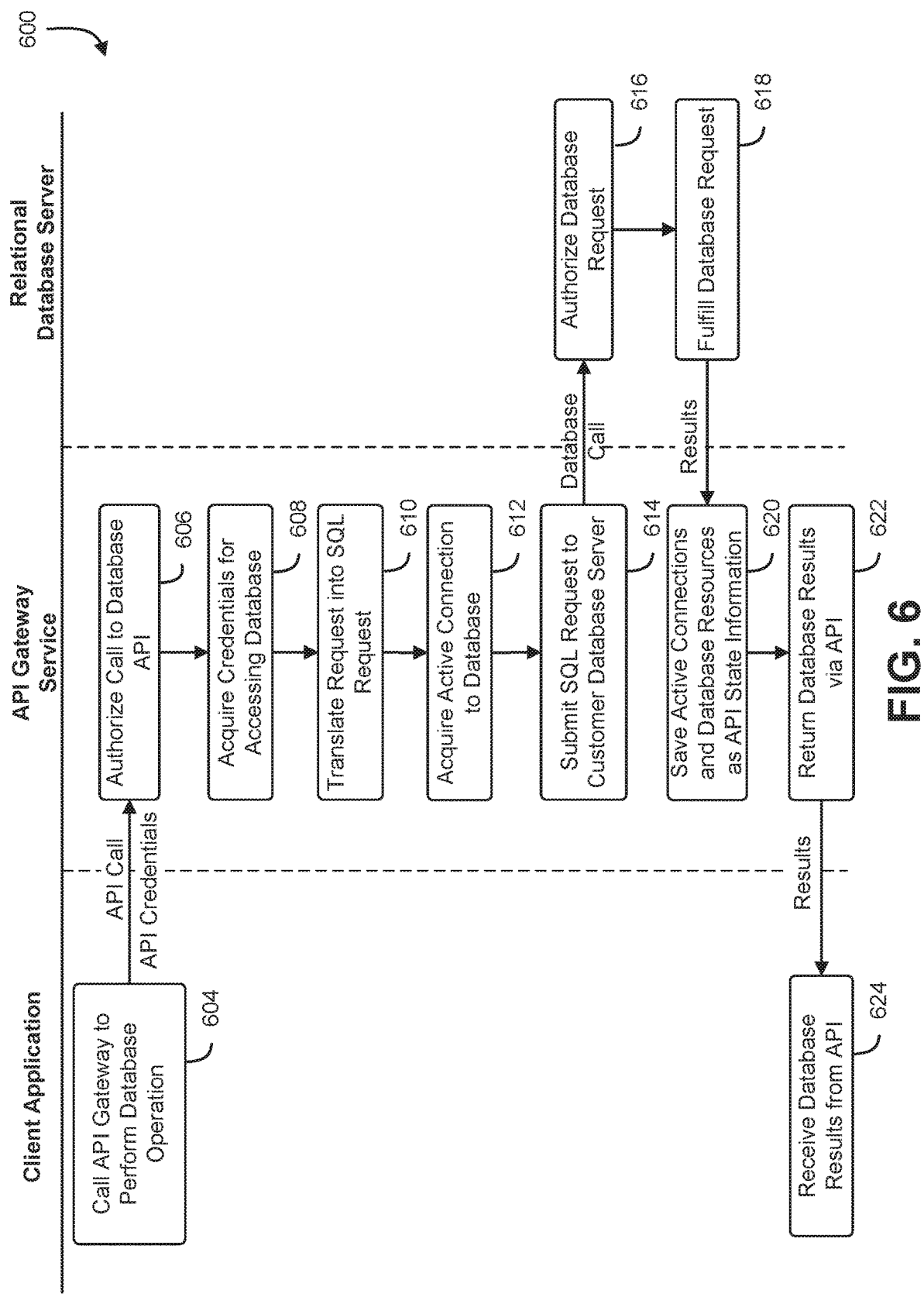
FIG. 6 shows an illustrative example of a process that, as a result of being performed by a client application, an API gateway service, and a relational database server, fulfils an API request that includes accessing the customer database server.

FIG. 6 shows an illustrative example of a process that, as a result of being performed by a client application, an API gateway service, and a relational database server, fulfils an API request that includes accessing the customer database server. A swim diagram 600 shows a process that begins at block 604. At block 604, the client application provides API credentials to the API gateway service as part of calling the database API.

At block 606, the API gateway service receives the request to invoke the database API and the API credentials. The API gateway service authenticates the API credentials and identifies the client application. A database of access controls accessible to the API gateway services is used to determine whether the database API call is authorized. If the API gateway service determines that the database API call is not authorized, the API gateway service blocks the call to the database API, and returns an error to the client application. If the API gateway service determines that the database API call is authorized, execution proceeds to block 608, and the API gateway service acquires credentials for accessing a backend database service. In some implementations, credentials for the relational database server are hardcoded in the database API. In other implementations, credential for the relational database server are retained by the API gateway service and made accessible to the database API. The API gateway service may include a credential API which allows client applications to submit credentials for backend services such as the relational database server. Client applications may submit updated credentials, but may not extract backend service credentials maintained within the API gateway service.

In some implementations, the API gateway service maintains a credential-translation table. The API gateway service uses the API credentials provided by the client application to extract one or more relational database credentials from the credential-translation table. The extracted relational database credentials are made available to the database API for use in the current invocation. The credential-translation table may provide relational database credentials based on the identity of the database API, the identity of the client application, or the particular backend service being accessed. For example, the database API may request, from the API gateway service, credentials for accessing the relational database server using the API credentials provided by the client application. In response, the API gateway service queries a credential-translation table and identifies a first relational database server credential associated with the API credentials, a second relational database server credential associated with the database API, and a third relational database server credential associated with the relational database server. The API gateway service may return a credential associated with a preferred context, or may return all of the identified credentials to the database API.

In some examples, at block 610, the API gateway service converts the database operation into a standard query language ("SQL") format. At block 612, the API database API acquires an active connection to the relational database server. In some implementations, connection pooling is used to maintain active connections between invocations of the database API. If connection pooling is used, the database API queries the API gateway service to acquire an active connection to the relational database server. If the API gateway service does not have an active connection to the relational database server in a connection pool, the API gateway service establishes a new database connection to the relational database server and provides the new database connection to the database API. In some implementations, the database API establishes new connections to the relational database server, and provides the new connections to the API gateway service for storage in a connection pool upon completion of the database API invocation. The database API submits 614 an SQL request to the relational database server via the active database connection along with relational database credentials that authorize the request. In some examples, the database API places a number of stored procedures on the relational database server, and the database API causes one or more of the stored procedures to be executed. In another example, the stored procedures are placed on the relational database server by an administrator and the database API signals the relational database server to execute one of the stored procedures.

At block 616, the relational database server receives the request from the database API. The relational database server authenticates the database credentials received from the database API, and determines whether the request is authorized. If the request is not authorized, the relational database server blocks the request and returns an error to the database API. If the request is authorized by the database credentials, execution proceeds to block 618 and the relational database server fulfills the request. In some examples, the request is fulfilled by executing SQL code provided by the database API. In another example, the request is fulfilled by executing a stored procedure on the relational database server. Results of fulfilling the request are returned to the database API.

At block 620, the API gateway service receives the results from the relational database server. The database API saves information describing the active database connection to a connection pool maintained by the API gateway service. In some implementations, the database API saves the results returned from the relational database server in association with the request submitted to the relational database server in a cache maintained by the API gateway service. The cache may be used by the database API to avoid similar database requests in later invocations of the database API. At block 622, the database API formats the results from the relational database server in accordance with the database API, and returns the results to the client application. At block 624, the client application receives the results from the API.

Figure 7:
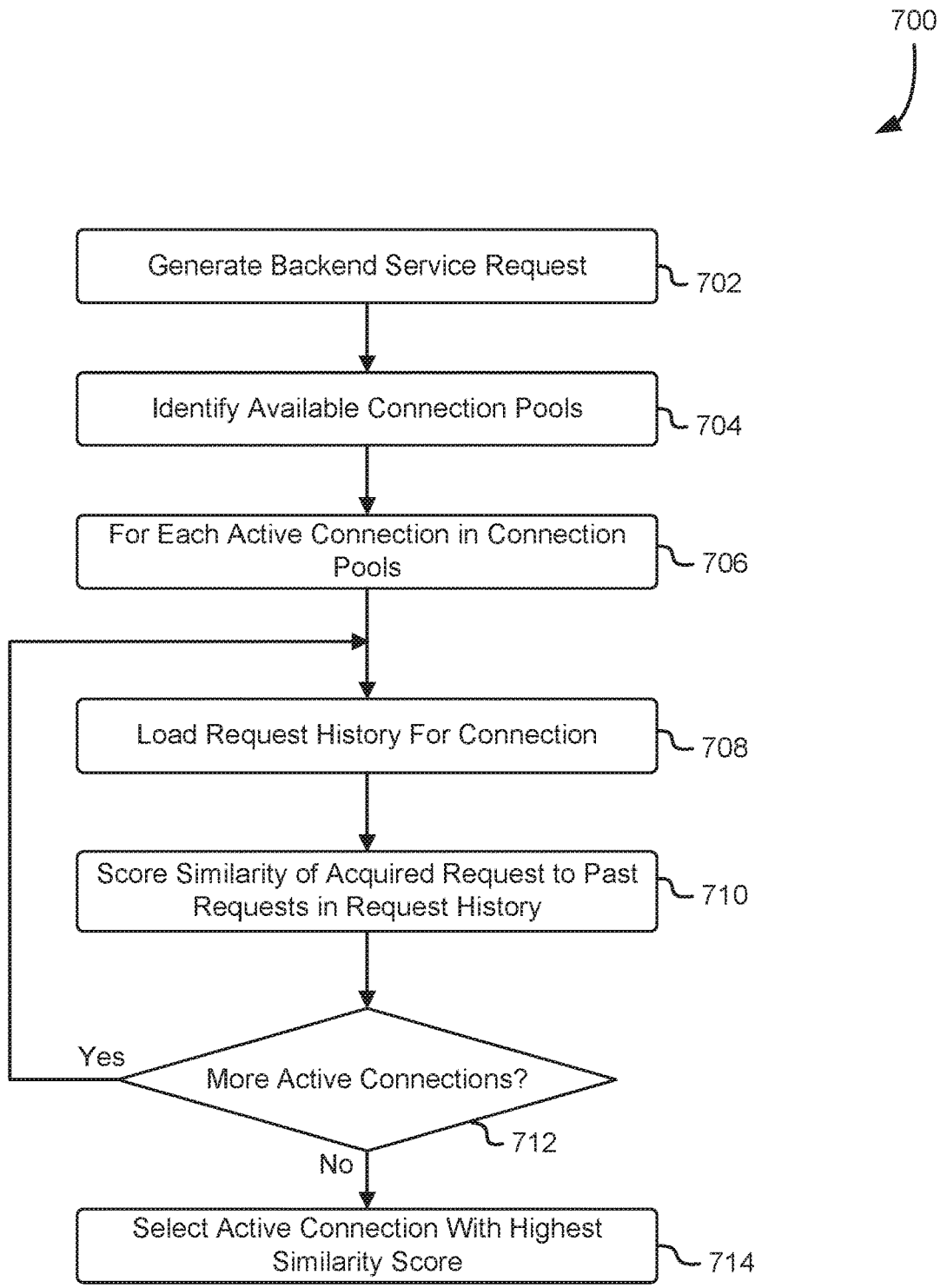
FIG. 7 shows an illustrative example of a process that selects an active connection to a backend service from a pool of active connections based at least in part on a request history that is associated with each connection.

FIG. 7 shows an illustrative example of a process that selects an active connection to a backend service from a pool of active connections based at least in part on a request history that is associated with each connection. A flowchart 700 illustrates a process that begins at block 702 with an API hosted by an API gateway service generating a backend request to a backend service. The API may be a database API, a cryptography API, the storage API, or device API. The backend service can be a relational database, an online storage service, a key management service, or a device management service. The backend request is a query, request, command, or instruction to be executed on the backend service.

To fulfill the backend request, the API acquires a connection to the backend service. At block 704, the API identifies connection pools that are available to the API. In some examples, the API maintains a connection pool within the API that maintains one or more active connections for use when accessing the backend service. In another example, the API stores a pool of active connections using state-management facilities provided by the API gateway service. The API gateway service maintains state information in a variety of storage contexts that are able to be specified by the API using the state-management facilities. The API gateway can maintain state information in a storage context that encompasses the API gateway, the API, a client application identified by authenticated API credentials, or a backend service. State information maintained by the API gateway can be shared within the context in which information is stored. The API may identify zero, one, or more connection pools, each of which may have a number of active connections.

At block 706, the API iterates through each active connection in the available connection pools. For each active connection, the API retrieves 708 a request history associated with the active connection. The request history for each active connection is maintained in association with the active connection in a connection pool. When requests are submitted by an API over an active connection, the request history associated with the active connection is updated by recording the request in the request history. The request history is maintained during the lifetime of the active connection. At block 710, the pending backend request is compared to requests recorded in the request history for the active connection being evaluated, and a score is generated. The score represents the similarity between the pending backend request, and requests previously processed by the active connection being evaluated. In some implementations, the score is determined at least in part by finding requests in the request history that match the pending request, and measuring the amount of time that has elapsed since the most recent matching request was fulfilled. In the example shown in FIG. 7, a higher score indicates greater similarities between past requests and the current request. The API determines 712 whether there are additional active connections to be evaluated. If there are additional active connections to be evaluated, execution returns to block 708 and the next active connection is evaluated. If there are no longer active connections to be evaluated, execution advances to block 714.

At block 714, the API selects an active connection from the set of available active connections having a high similarity score. In some implementations, a higher similarity score correlates with a higher probability that the pending request may be satisfied by a request cache maintained by the backend service.

Figure 8:
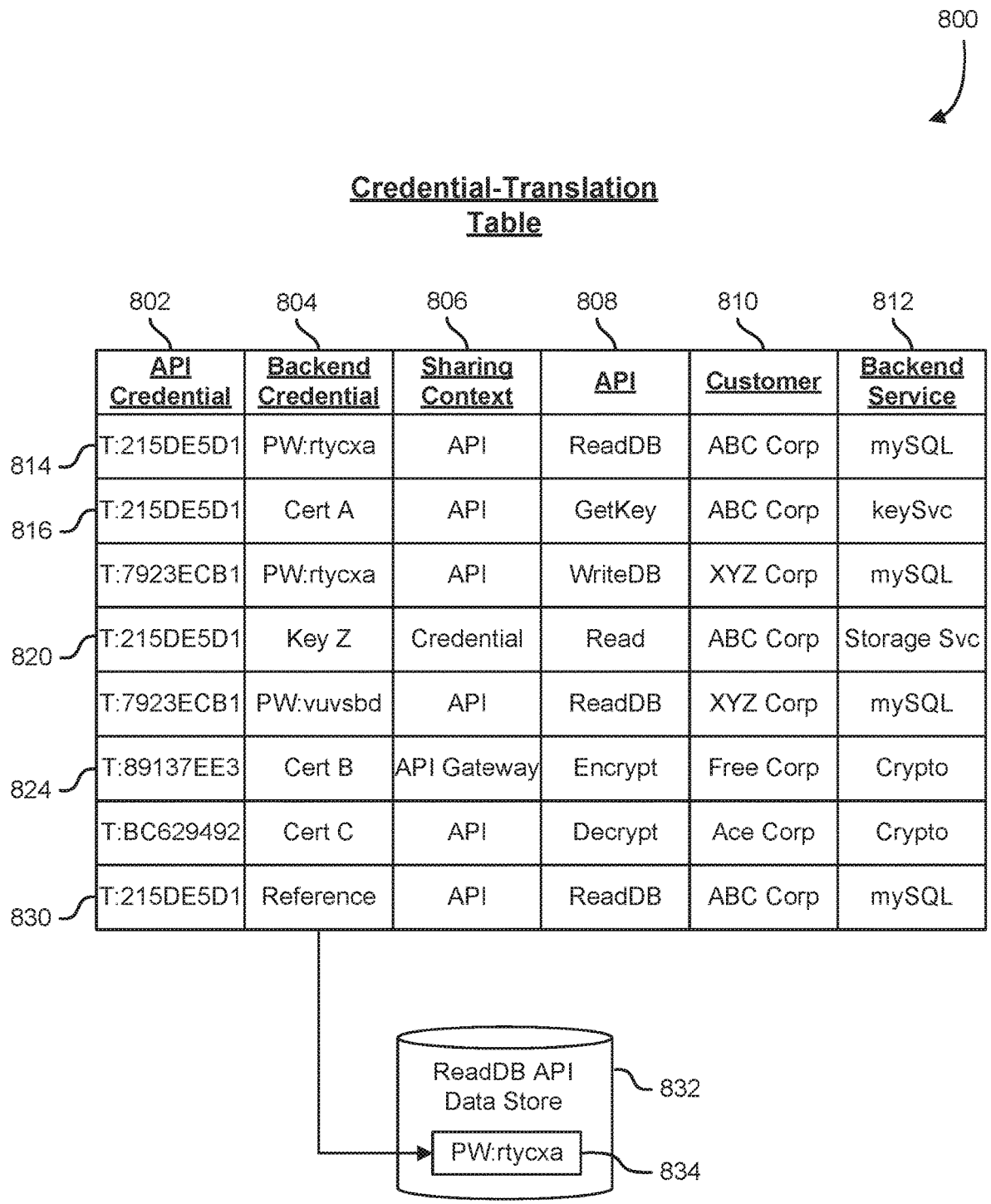
FIG. 8 shows an illustrative example of a credential-translation table used by an API gateway service to translate API credentials to credentials associated with backend services.

FIG. 8 shows an illustrative example of a credential-translation table used by an API gateway service to translate API credentials to credentials associated with backend services. A data diagram 800 shows a structure of the credential-translation table. The credential-translation table includes a number of data columns. An API credential column 802 holds a value that identifies an API credential. In various examples the value may be a token, username, public key, digital certificate, or other value identified with a particular API credential. In some examples, the value may be a reference to the above-referenced value types. A backend credential column 804 holds the backend credential associated with the API credential. The backend credential may be a username/password combination, a cryptographic key, a security token, digital certificate, or other form of digital credential. In some examples, the backend credential column 804 includes a reference or key that allows access to the backend credential, which is stored elsewhere. For example, the backend credentials may be maintained in an HSM, and the backend credential column 804 may contain information allowing an API to use the backend credentials without removing them from the HSM.

The credential-translation table includes a sharing context column 806. The information contained in the credential-translation table may be shared in accordance with the sharing context specified in the sharing context column 806. When a backend credential is loaded into the credential-translation table, the provider of the backend credential specifies a sharing context. The sharing context may limit access to the backend credential to a particular API, client application, customer, or API gateway. In some implementations, a particular backend credential maintained in the credential-translation table may be updated by any entity authorized to access the particular backend credential. For example, if a particular backend credential is shared across all APIs on an API gateway, a different API on the API gateway that is invoked by another customer may update the particular backend credential stored in the credential-translation table.

The credential-translation table maintains a number of columns that identify an owner of the backend credential. An API column 808 identifies a particular API with which the backend credentials are associated. In some examples, the API column 808 identifies the primary API that uses the backend credential. A customer column 810 identifies the primary entity that uses the backend credential. In various examples, the customer column may identify a customer, a client application, or a user, which is authorized to use the backend credential. A backend service column 812 identifies the particular backend service associated with the backend credential. The backend service may be identified by a service name, a network address and port, a protocol identifier, a server ID, or other service identifier.

Each row of the credential-translation table contains information that allows an API credential to be converted to an associated backend credential. In various examples, a particular API credential may not be represented in the credential-translation table and, therefore, no translation may be made. In another example, a particular API credential may match more than one row of the credential-translation table, resulting in more than one backend credential being associated with the particular API credential.

A variety of translations from API credentials to backend credentials are possible using the credential-translation table. Row 814 is an example of a row that converts an API credential to a backend credential in the form of a password. The backend credential is accessible only to the API named "ReadDB." Row 816 is an example of a row that converts an API credential to a backend credential in the form of a digital certificate. The backend credential is accessible only to the API named "GetKey." Row 820 is an example of a row that makes a backend credential available to any API that provides the API credential. Row 824 is example of a row that makes a backend credential available to any API hosted by the API gateway.

Row 830 is an example of how the credential-translation table may use other storage locations or other storage devices to retain backend credentials. The backend credential column of row 830 includes a reference to a data store 832. The reference may be a link to a file on the file system, a filename, a memory address, a URL, a pointer, or other reference to a location on a storage device. The data store may be a volume, directory, region of memory, data table, or database. The reference points to a backend credential 834 that is stored at the location indicated by the reference. Storing backend credentials as a reference within the credential-translation table may enable multiple rows of the credential-translation table to refer to a particular backend credential, causing updates to the particular backend credential to be applied to all rows of the credential-translation table.

Figure 9:
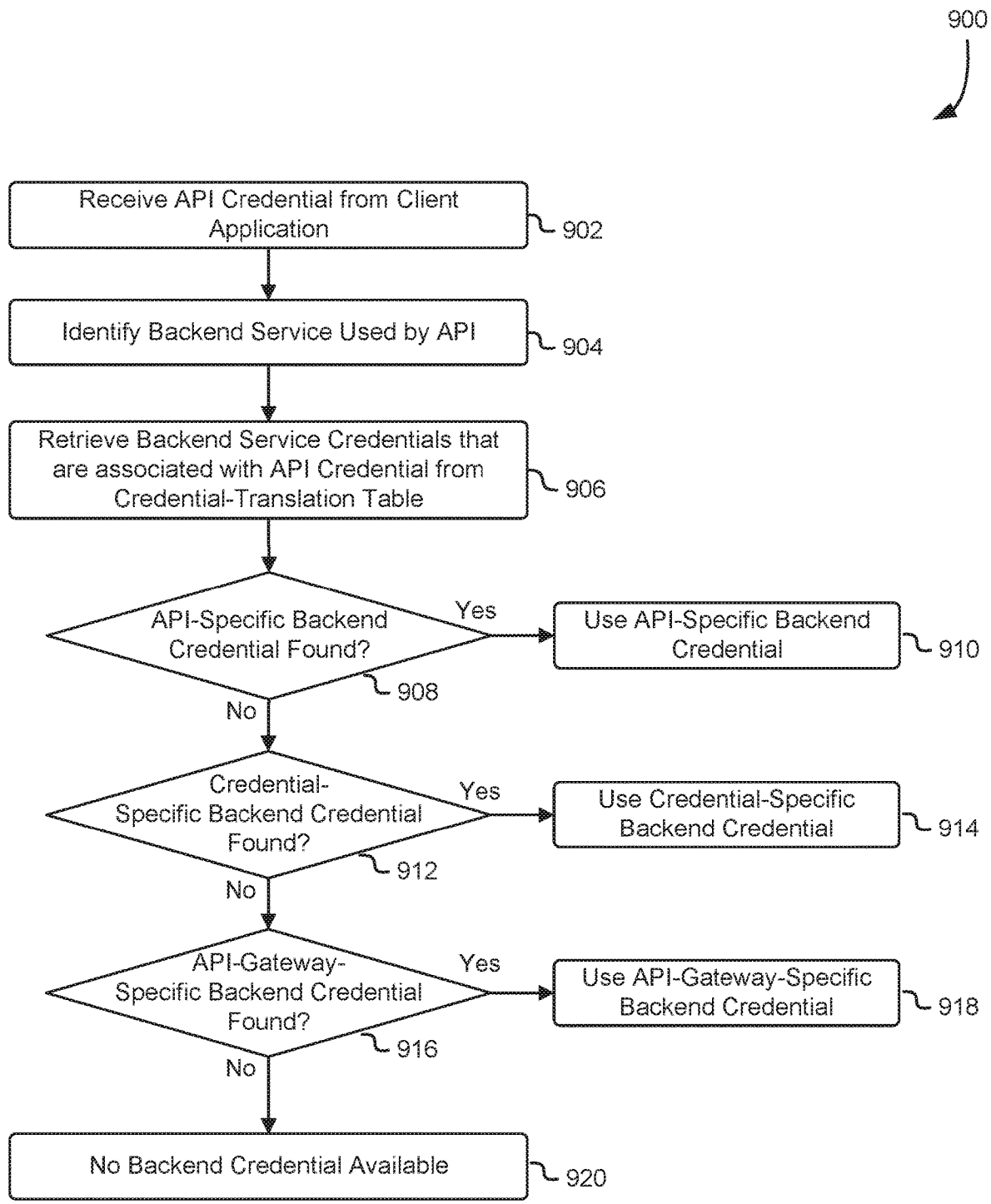
FIG. 9 shows an illustrative example of a process that, when performed by an API gateway, uses an API credential supplied by a caller of an API to acquire a backend service credential from a credential-translation table.

FIG. 9 shows an illustrative example of a process that, when performed by an API gateway, uses an API credential supplied by a caller of an API to acquire a backend service credential from a credential-translation table. The process illustrated in a flowchart 900 begins at block 902 with the API gateway service receiving an API credential from a client application. An API hosted by the API gateway service generates a request to access a backend service. As part of generating a request, the API identifies 904 the backend service to the API gateway service, and requests a credential for accessing the backend service. The API gateway service accesses a credential-translation table, and uses the API credentials to identify 906 a set of accessible backend credentials for the backend service.

The API gateway examines the set of backend credentials and identifies a preferred backend credential for the API to use. At decision block 908, the API gateway determines whether a backend credential in the set of backend credentials is specific to the API requesting the backend credential. In some implementations, the API gateway determines that the backend credential is specific to the API by using a credential-translation table to confirm that the sharing context of the backend credential is 'API,' and that the API associated with the backend credential matches the API. If the API gateway determines that an API-specific backend credential is in the set of accessible backend credentials, the API-specific backend credential is provided to the API and the API uses 910 the API-specific backend credential when accessing the backend service.

At decision block 912, the API gateway determines whether a backend credential in the set of backend credentials is associated with the API credentials used to call the API. In some implementations, the API gateway determines that the backend credential is specific to the caller of the API by using a credential-translation table to confirm that the sharing context of the backend credential is 'credential.' If the API gateway determines that the backend credential is specific to the caller of the API, execution proceeds to block 914 where the API uses the credential-specific backend credential when accessing the backend service.

At decision block 916, the API gateway determines whether a backend credential in the set of backend credentials is accessible to all APIs hosted by the API gateway. In some implementations, whether a particular credential is accessible to all APIs may be determined by confirming that the sharing context of a backend credential is set to the value of 'API Gateway.' If the backend credential that is accessible to all APIs in the API gateway is found, the API uses 918 the API-gateway backend credential to access the backend service.

In some implementations, the API gateway may perform additional searches to locate a suitable backend credential. In some examples, the API gateway may determine whether the backend service is accessible without a backend service credential. In another example, the API gateway may attempt to access the backend service using a default credential. In yet another example, the API gateway may attempt to generate a new credential for the backend service by requesting a new account, new password, or password reset from the backend service. The searches with which the API gateway locates a suitable backend credential may be performed in any order, but changing the order may alter the priority associated with the use of various backend credentials. If the API gateway is able to acquire a backend service password, the backend service password is provided to the API. If the API gateway is unable to acquire a backend service password, execution advances to block 920, and the API gateway reports to the API that no backend credential is available for the backend service.

In some examples, the API gateway affirmatively revokes a credential of a backend service in response to a revocation request submitted by a client application or an administrator. If a revocation request for a particular credential is received by the API gateway, the API gateway searches a credential-translation table for the particular credential, and identifies a particular backend service associated with the backend credential. The API gateway service submits a revocation request to the particular backend service, causing the particular credential to be invalidated by the backend service. In some implementations, the API gateway service receives a replacement credential from the backend service, and saves the replacement credential in the credential-translation table. The API gateway may notify users, client applications, and administrators that the particular credential has been changed.

Figure 10:
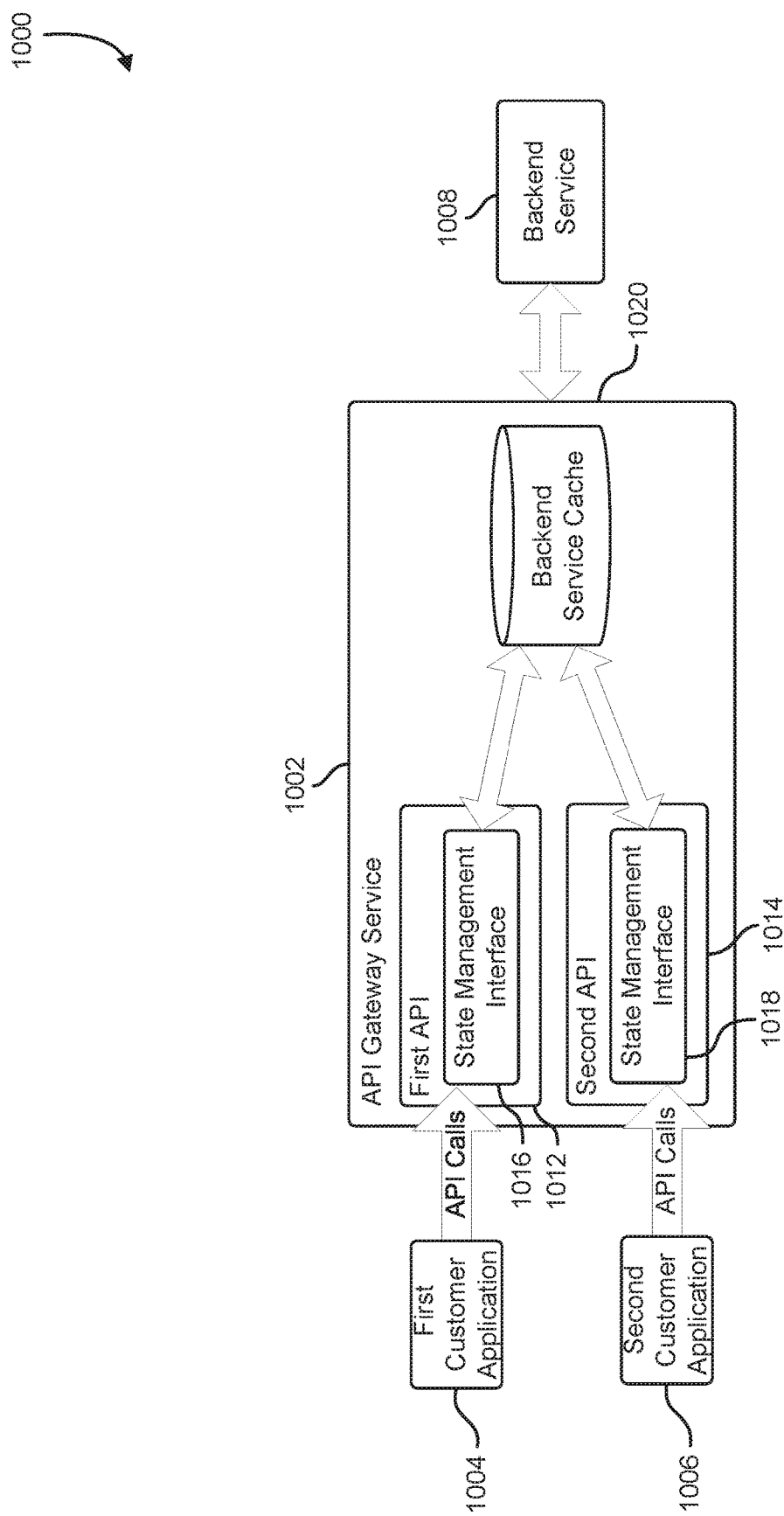
FIG. 10 shows an illustrative example of an API gateway service that maintains a backend cache of information associated with a backend service.

FIG. 10 shows an illustrative example of an API gateway service that maintains a backend cache of information associated with a backend service. A system diagram 1000 includes an API gateway service 1002 that hosts a number of APIs which are accessible to a first customer application 1004 and a second customer application 1006. The APIs hosted by the API gateway service 1002 access a backend service 1008. The backend service 1008 may be a database service, a storage service, or other service that provides data to the APIs hosted by the API gateway service 1002. API gateway service 1002 hosts a first API 1012 and a second API 1014. The first API 1012 includes a state management interface 1016 for accessing state information maintained by the API gateway service 1002 for the first API 1012. The second API 1014 includes a state management interface 1018 for accessing state information maintained by the API gateway service 1002 on behalf of the second API 1014.

The API gateway service 1002 maintains a backend service cache 1020 that is shared between the first API 1012 and the second API 1014. When the first API 1012 and the second API 1014 interact with the backend service 1008, the APIs store requests sent to, and results received from, the backend service 1008 and the backend service cache 1020 via their corresponding state management interfaces 1016 and 1018. Before either API executes a request to the backend service 1008, the API queries the backend service cache 1020 to determine if the request has been previously submitted to the backend service 1008 within a configurable expiration time. If the request has been previously submitted to the backend service 1008 within the expiration time, the request may be fulfilled using the corresponding result stored in the backend service cache 1020.

Figure 11:
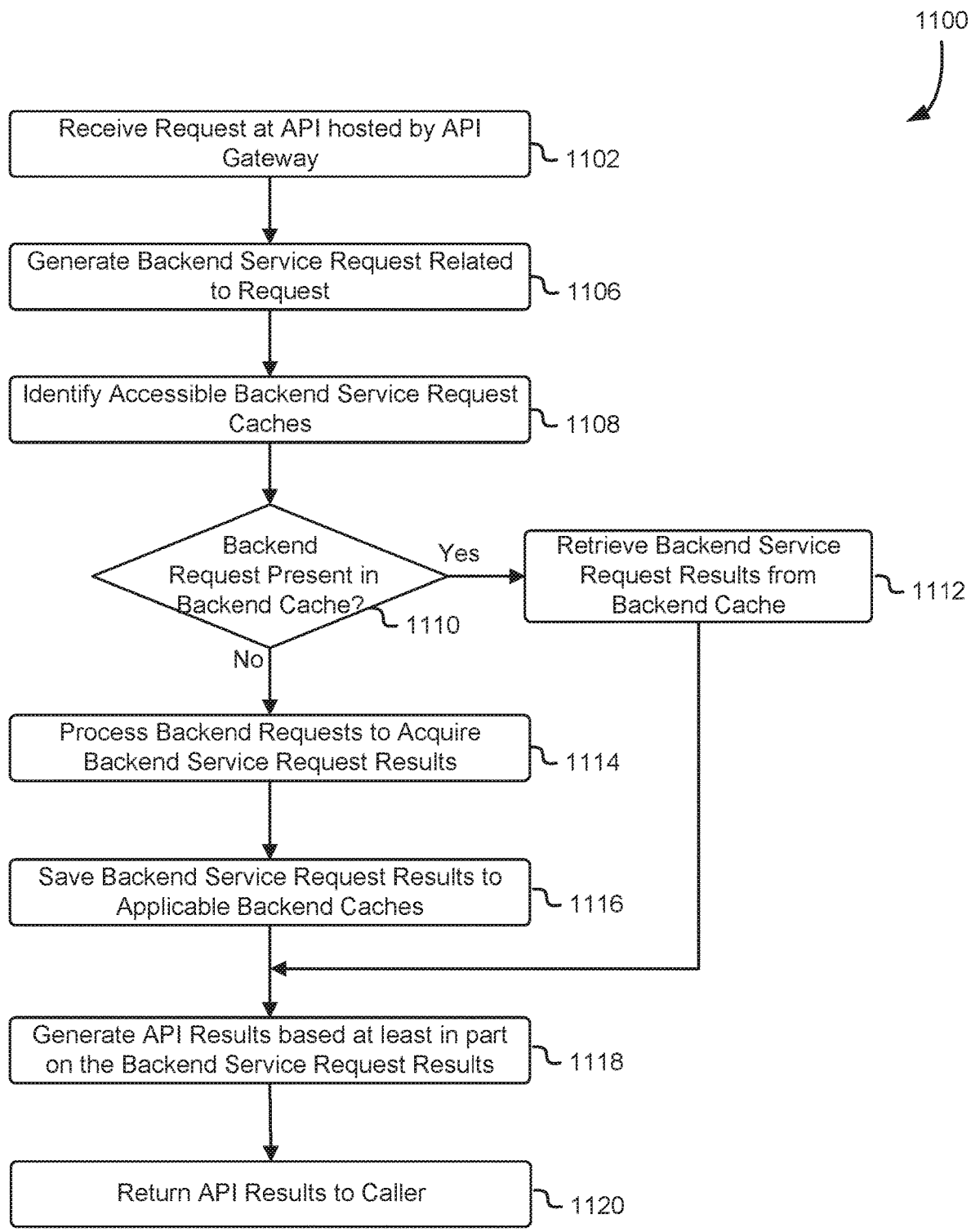
FIG. 11 shows an illustrative example of a process that, as a result of being performed by an API hosted by a gateway service, manages a cache of results associated with a backend service.

FIG. 11 shows an illustrative example of a process that, as a result of being performed by an API that is hosted by a gateway service, manages a cache of results associated with a backend service. A flowchart 1100 illustrates a process that begins at block 1102 with the API receiving a request from a client application. As part of fulfilling the request from the client application, the API generates 1106 the service request to a backend service. In some examples, the backend services a relational database server, and the service request is a SQL query.

Before submitting the service request to the backend service, the API identifies 1108 any backend service request caches maintained by the API gateway service. The API may use backend service request caches stored by the API gateway service on behalf of the API, the client application, or shared across the API gateway. More than one cache may be used in combination. At decision block 1110, the API searches the identified backend service request caches for a request that matches the pending service request. If a non-expired matching service request is found, execution advances to block 1112 and the API retrieves a corresponding request result from the backend service request cache. If the API retrieves the corresponding request result from the backend service request cache, the process bypasses the operations that submit the request to the backend service.

If a non-expired matching service request is not found, execution advances to block 1114 and the API submits the backend service request to the backend service. The backend service returns backend service request results to the API. At block 1116, the API saves the backend service request results in each of the accessible backend service request caches. In some examples, the API saves the backend service request results in every backend service request cache that is accessible to the API. In another example, the API saves the backend service request results in the backend service request cache that has the broadest sharing scope preferring, for example, API gateway scope over client application scope, and client application scope over API scope.

At block 1118, the API processes the results received from the backend service to produce results that can be returned via the API to the client application. In some examples, the results returned to the client application may be an indication that an operation was successful or unsuccessful. In other examples, the results returned to the client application may be a string or sequence of numerical values based at least in part on the results received from the backend service. At block 1120, the processed results are returned to the client application via the API.

Figure 12:
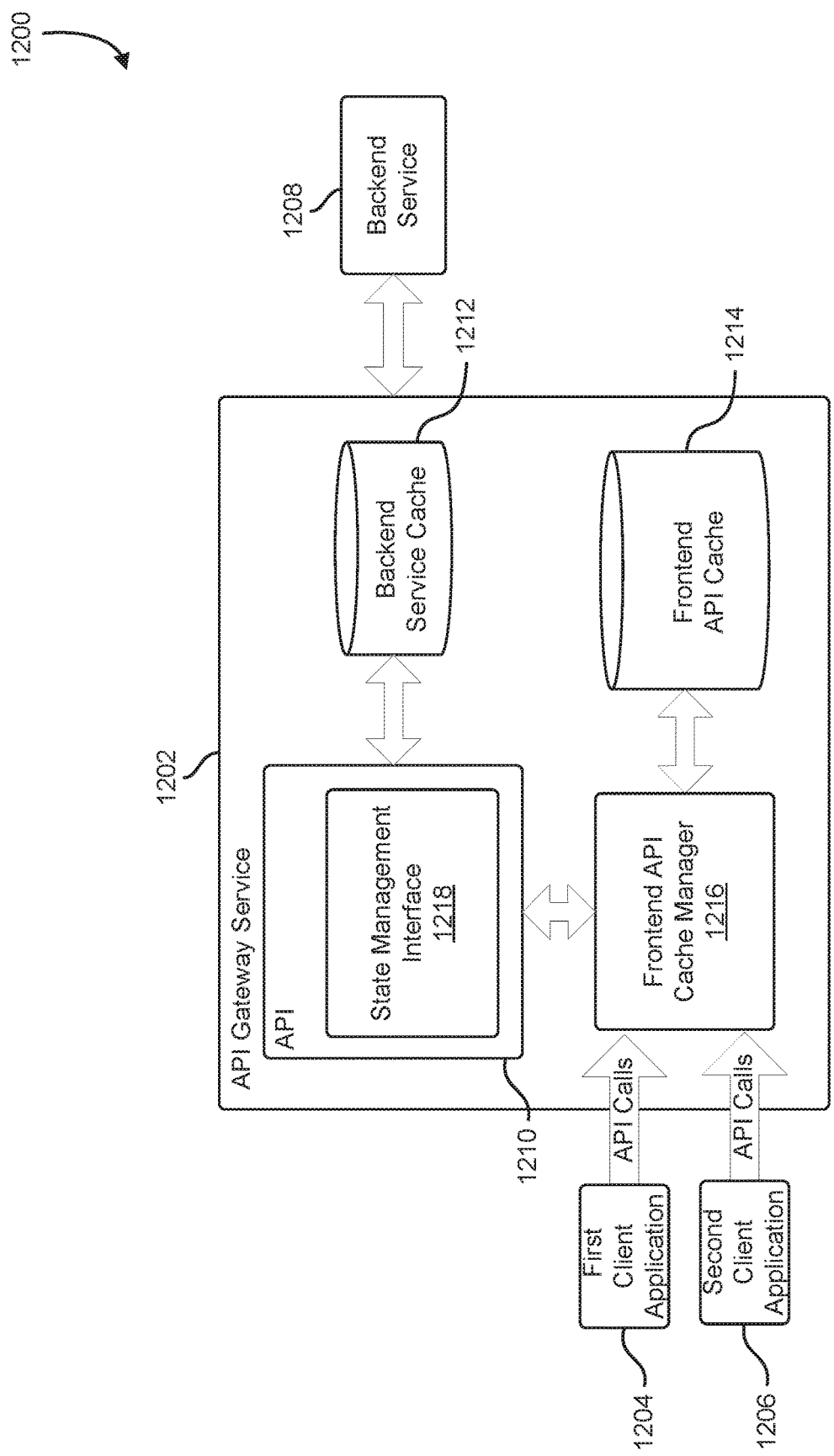
FIG. 12 shows an illustrative example of an API gateway service that maintains a backend cache of information associated with a backend service and a frontend cache of information associated with the API.

FIG. 12 shows an illustrative example of an API gateway service that maintains a backend cache of information associated with a backend service and a frontend cache of information associated with the API. A system diagram 1200 shows an API gateway service 1202 that is used by a first client application 1204 and a second client application 1206 to access a backend service 1208. The API gateway service 1202 hosts an API 1210, and maintains a backend service cache 1212 and a frontend API cache 1214 for the API 1210. The frontend API cache 1214 is managed by a frontend API cache manager 1216. The backend service cache 1212 is managed by a state management interface 1218 within the API 1210.

When a client application calls an API hosted by the API gateway service 1202, the frontend API cache manager 1216 intercepts the API call and queries the frontend API cache 1214. If the frontend API cache 1214 includes a stored API request and result that matches the incoming API call, the frontend API cache 1214 returns the result to the frontend API cache manager 1216. If the result returned by the frontend API cache 1214 is not expired, the frontend API cache manager 1216 returns the result to the caller, and avoids invoking the API 1210. If there is not a matching API request in the frontend API cache 1214, the frontend API cache manager 1216 forwards the request to the API 1210. The API 1210 fulfills the API call, and returns API results to the frontend API cache manager 1216. The frontend API cache manager 1216 saves the API request and the corresponding results to the frontend API cache 1214, and returns the API results to the client application. In some examples, the frontend API cache manager 1216 maintains a separate frontend API cache for each client application. In another example, frontend API cache manager 1216 maintains a frontend API cache 1214 for each API hosted by the API gateway service 1202.

When the API 1210 receives an API request from the frontend API cache manager 1216, the API generates an associated backend service request. The API 1210 accesses the state management interface 1218, which queries the API gateway service 1202 to identify caches that are applicable to the backend service 1208. API gateway service 1202, in various examples, may maintain a backend service cache in association with the backend service, the requesting client application, or the API. The API gateway service 1202 may provide more than one backend service cache to the state management interface 1218. The state management interface 1218 determines whether any backend service cache contains a backend service request that matches the new backend service request. If a matching service request is found in a backend service cache, the results associated with the matching service request are returned to the state management interface 1218 and provided to the API 1210. If the request retrieved from the backend service cache 1212 is not expired, a query to the backend service 1208 may be avoided. If a backend service request matching the new backend service request is not found in a backend service cache, the API 1210 submits the backend service request to the backend service 1208. Results are received from the backend service 1208. The results, and the corresponding backend service request, are provided to the state management interface 1218, and the state management interface 1218 updates the backend service cache 1212. In some examples, the state management interface 1218 updates each backend service cache identified by the API gateway service 1202. In another example, the state management interface 1218 updates a backend service cache having the broadest identified storage context.

Figure 13:
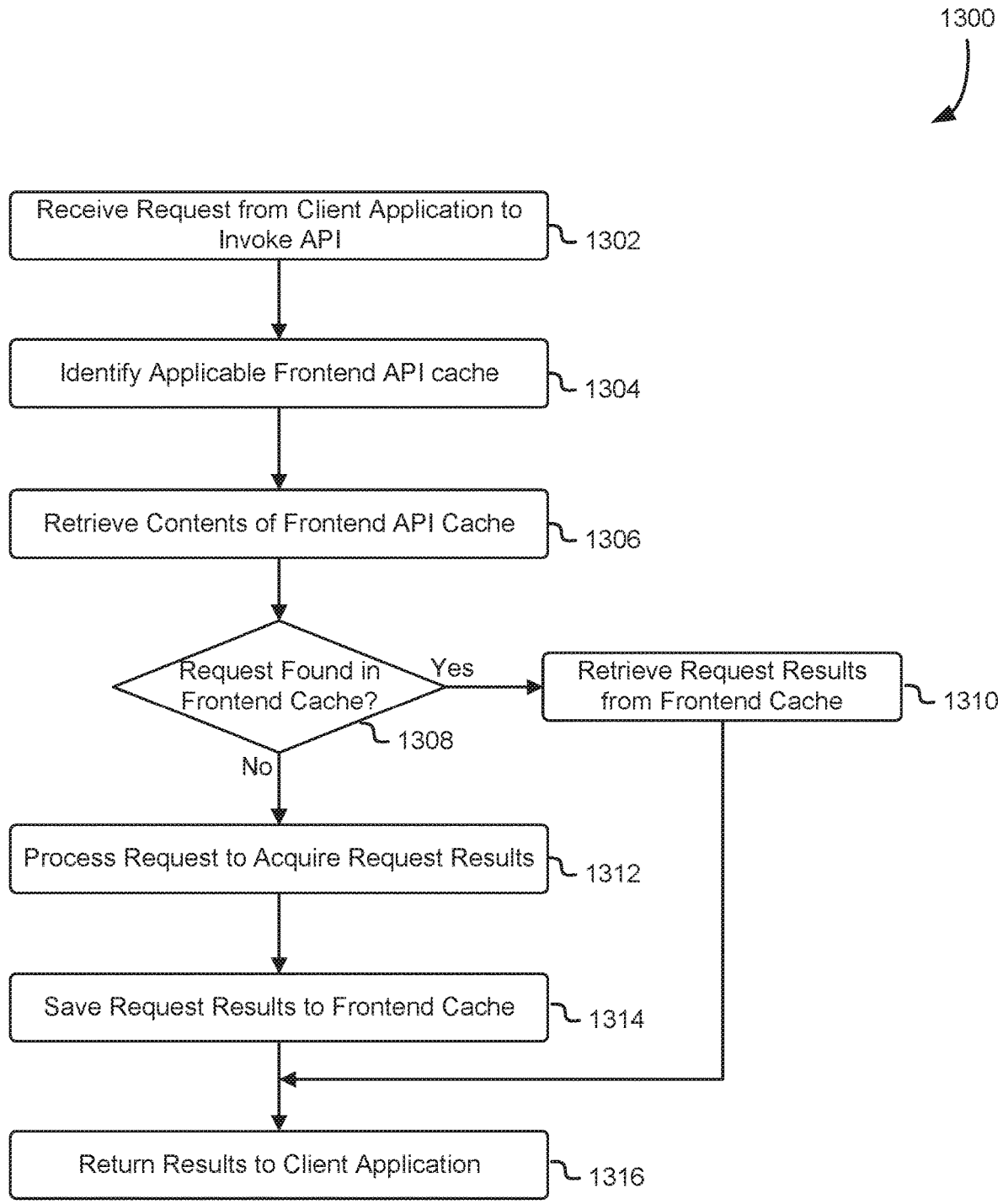
FIG. 13 shows an illustrative example of a process that caches the results of API calls and uses the cached results to fulfill later requests.

FIG. 13 shows an illustrative example of a process that, when executed by an API gateway, caches the results of API calls and uses the cached results to fulfill later requests. A flowchart 1300 begins at block 1302 with an API gateway receiving a request from a client application to invoke an API. An API cache manager in the API gateway identifies 1304 a frontend cache that is applicable to the API call. In some examples, the API cache manager identifies a frontend cache that is associated with the API being called. In another example, the API cache manager identifies a frontend cache for the API being called that is specific to the client application making the API call. In yet another example, the API cache manager identifies a particular frontend cache for the API being called that is specific to the API credentials supplied by the client application when making the API call.

The API cache manager examines 1306 the contents of the API cache identified by the API cache manager to determine whether a request/result pair maintained in the identified API cache matches the API request submitted by the client application. If the API cache manager determines 1308 that the API cache contains a matching API request, execution proceeds to block 1310 and the API cache manager retrieves the matching request results from the identified API cache, and invoking the API may not be necessary. If the API cache manager determines 1308 that the API cache does not contain a matching API request, execution proceeds to block 1312 and the API cache manager invokes the API to process the request from the client application. The API returns API results to the API cache manager, and the API cache manager updates the identified API cache by saving 1314 information that describes the API request with the corresponding results in the identified API cache.

At block 1316, the API cache manager returns the results obtained by invoking the API to the client application. In some examples, the API cache manager may indicate to the client application whether the request is fulfilled from a frontend API cache or by invoking the API.

Figure 14:
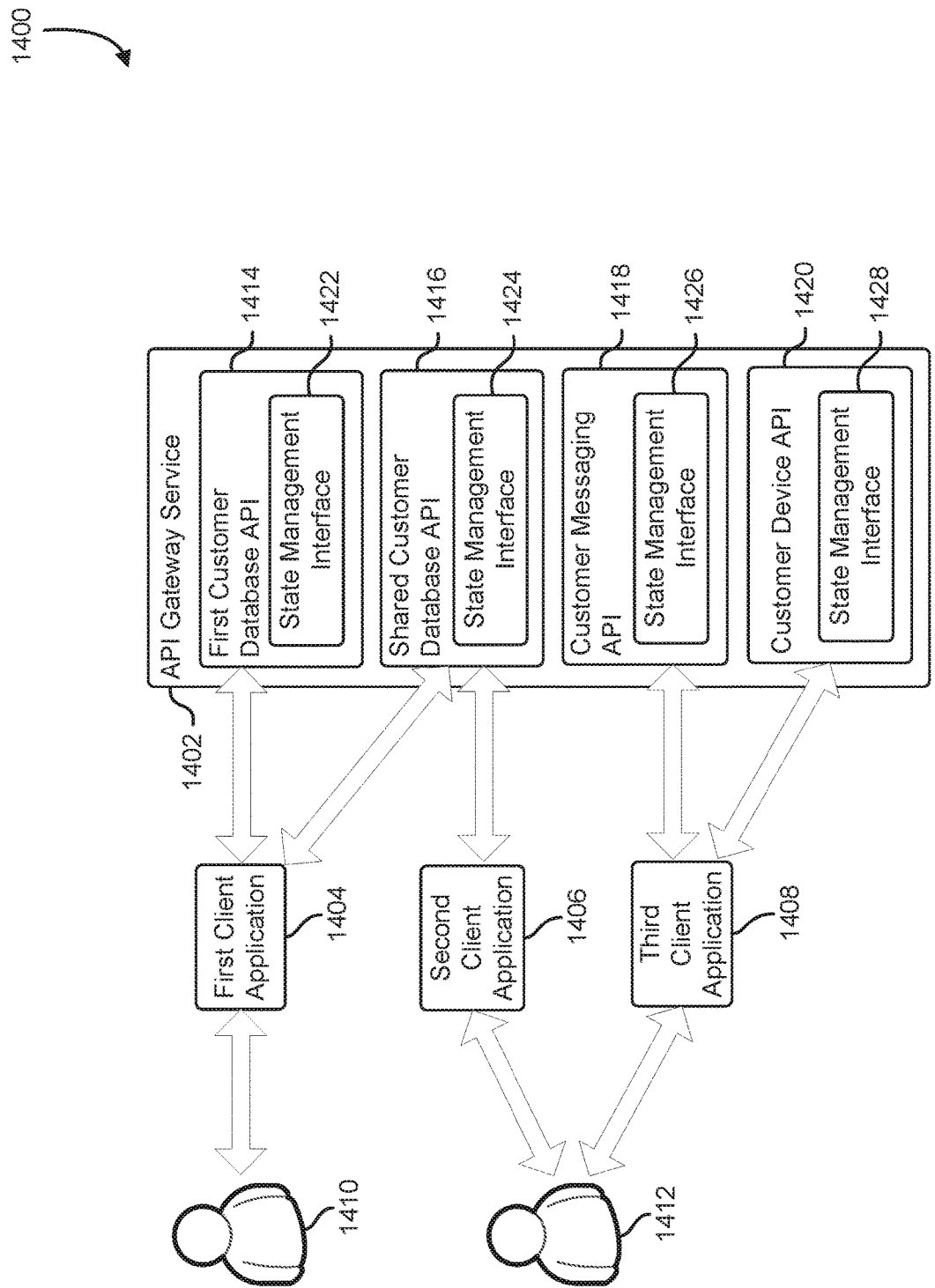
FIG. 14 shows an illustrative example of an API gateway service that provides a number of APIs to a number of different client applications controlled by different customers.

FIG. 14 shows an illustrative example of an API gateway service that provides a number of APIs to a number of different client applications controlled by different customers. A system diagram 1400 shows an API gateway service 1402. The API gateway service 1402 hosts a number of APIs that are accessed by the first client application 1404, a second client application 1406, and a third client application 1408. The first client application 1404 is controlled by a first customer 1410. A second customer 1412 controls the second client application 1406 and the third client application 1408.

The API gateway service 1402 provides a first customer database API 1414 that is accessed by the first client application 1404. A shared customer database API 1416 is utilized by the first client application 1404 and the second client application 1406. The third client application 1408 accesses a customer messaging API 1418 and a customer device API 1420. The second client application 1406 and the third client application 1408 are both controlled by the second customer 1412.

The APIs maintained by the API gateway service 1402 are able to access state information maintained by the API gateway service via a corresponding state management interface 1422, 1424, 1426, and 1428. State information maintained by the API gateway service 1402 may be stored in various storage contexts. For example, state information may be stored in association with a particular customer, client application, or API. Information stored in association with a particular API may be accessed only from that particular API. Information stored in association with a particular customer may be accessed only by client applications that provide credentials associated with that particular customer. Information associated with a particular client application may be accessed only when an API is called from the particular client application.

Figure 15:
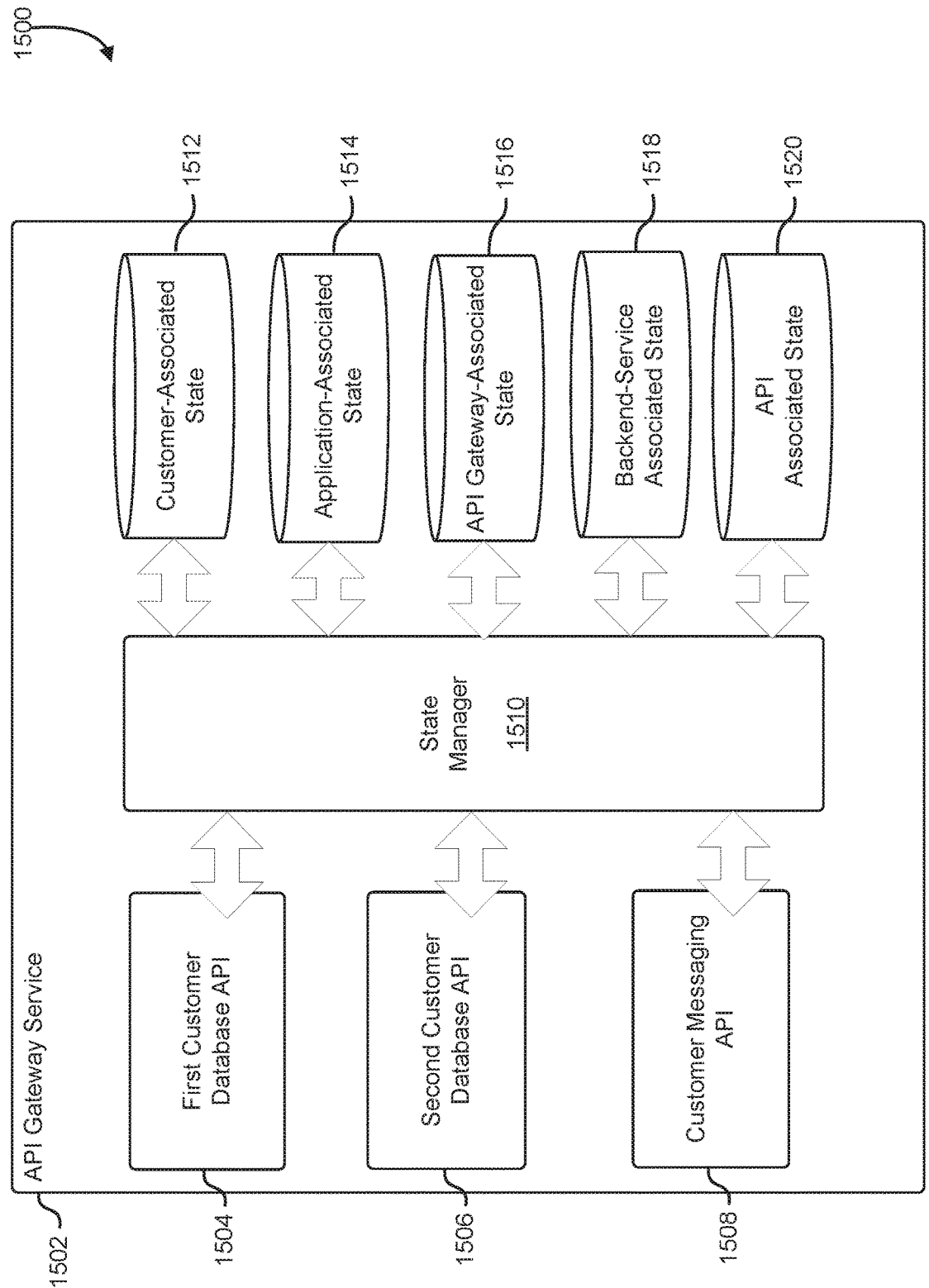
FIG. 15 shows an illustrative example of an API gateway service that maintains state information associated with various state contexts.

FIG. 15 shows an illustrative example of an API gateway service that maintains state information associated with various state contexts. A system diagram 1500 shows an API gateway service 1502 that hosts a number of APIs. The API gateway service 1502 hosts a first customer database API 1504, a second customer database API 1506, and a customer messaging API 1508. The APIs hosted by the API gateway service 1502 access a state manager 1510. The state manager 1510 manages access to a number of data stores containing state information from various storage context. The data stores may be maintained on a local storage device such as a disk drive or solid-state memory. In some examples, the data stores are stored on a remote storage device such as network attached storage device, or a remote database server.

A customer-associated state data store 1512 holds state information that is associated with customers that call the APIs hosted by the API gateway service 1502. A particular customer may be identified based at least in part on the API credentials supplied when calling an API hosted by the API gateway service 1502. The API gateway service 1502 authenticates the identity of a particular customer that calls an API, and the state manager 1510 limits access to state information maintained in the customer-associated state data store to information that is associated with the particular customer.

An application-associated state data store 1514 holds state information that is associated with client applications that call the APIs hosted by the API gateway service 1502. A particular client application can be identified by confirming the source of the API call such as a network address or return address. The state manager 1510 limits access to state information maintained in the application-associated state data store to information that is associated with the particular client application. An API gateway-associated state data store 1516 holds state information that is associated with the API gateway service 1502. State information maintained in the API gateway-associated state data store 1516 is accessible to all APIs hosted by the API gateway service 1502. A backend-service associated state data store 1518 holds state information that is associated with various backend services. APIs hosted by the API gateway service 1502 may request credentials or cache information for a particular backend service. The state manager 1510 returns only the information relevant to the identified backend service. An API-associated state data store 1520 holds information that is associated with various APIs hosted by the API gateway service 1502. The state manager 1510 limits access to information in the API-associated state data store so that each API hosted by the API gateway service 1502 may not access state information from another API hosted by the API gateway service 1502.

Figure 16:
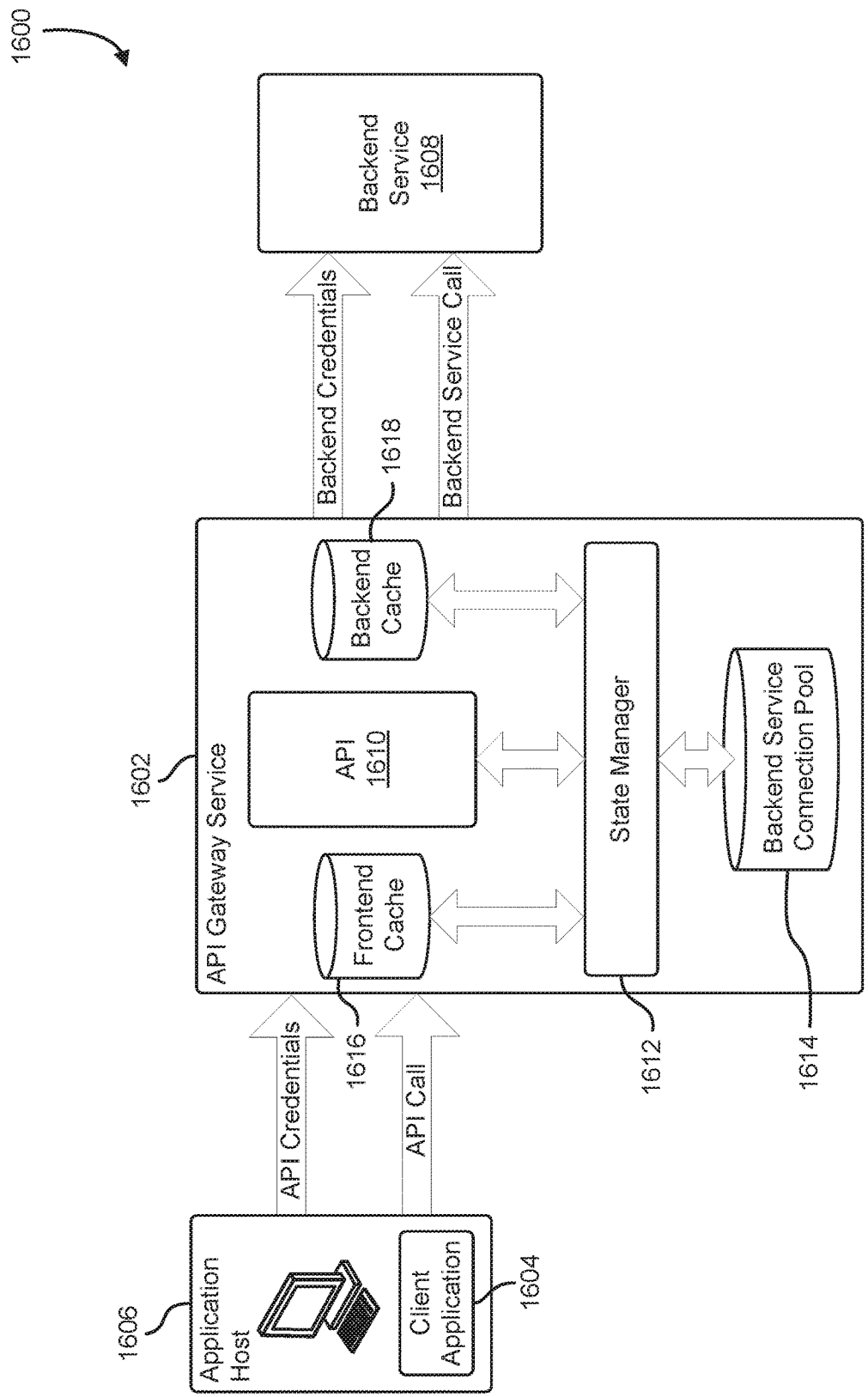
FIG. 16 shows an illustrative example of an API gateway service that provides a frontend cache, a backend cache, and a connection pool for the use by a customer API.

FIG. 16 shows an illustrative example of an API gateway service that provides a frontend cache, a backend cache, and a connection pool for use by a customer API. A system diagram 1600 includes an API gateway service 1602 that is called by a client application 1604 hosted by an application host 1606. The application host may be a computer system, a virtual computer system, a container runtime, a computer server, or a serverless runtime environment. The API gateway service 1602 utilizes a backend service 1608 to fulfill requests submitted by the client application 1604. The API gateway service 1602 hosts an API 1610. The API 1610 uses a state manager 1612 to access a backend service connection pool 1614, a frontend cache 1616, and a backend cache 1618.

The client application 1604 invokes the API 1610 by submitting a request to the API gateway service 1602 that includes API credentials that authorize access to the API 1610. The API gateway service 1602 examines the frontend cache 1616 and determines whether the frontend cache includes a cached result for the request. If the frontend cache 1616 includes a non-expired matching request, the corresponding result is returned to the client application 1604. If the frontend cache 1616 does not include a matching request, the API gateway service invokes the API 1610.

The API 1610 converts the API request to a corresponding backend request to be submitted to the backend service 1608. Before submitting the backend request to the backend service 1608, the API checks the backend cache 1618 to determine whether the backend cache 1618 contains a non-expired response to the backend request. If the backend cache contains a non-expired response that matches the backend request, the information from the backend cache 1618 is used to determine the results returned to the client application 1604, and the backend request is not submitted to the backend service 1608. If the backend cache 1618 does not contain a matching request, the API 1610 queries the backend service connection pool 1614 to acquire an active connection to the backend service 1608. If the backend service connection pool 1614 does not include an active connection to the backend service 1608, the API 1610 generates a new active request to the backend service 1608.

The API 1610 submits the backend request to the backend service 1608 and receives backend results from the backend service 1608. The backend cache 1618 is updated using the backend results. API results for returning to the client application 1604 are generated based at least in part on the backend results. The frontend cache 1616 is updated using the API results, and the API results are returned to the client application 1604. The active connection to the backend service 1608 is placed in the backend service connection pool 1614, and the invocation of the API 1610 is completed.

Figure 17:
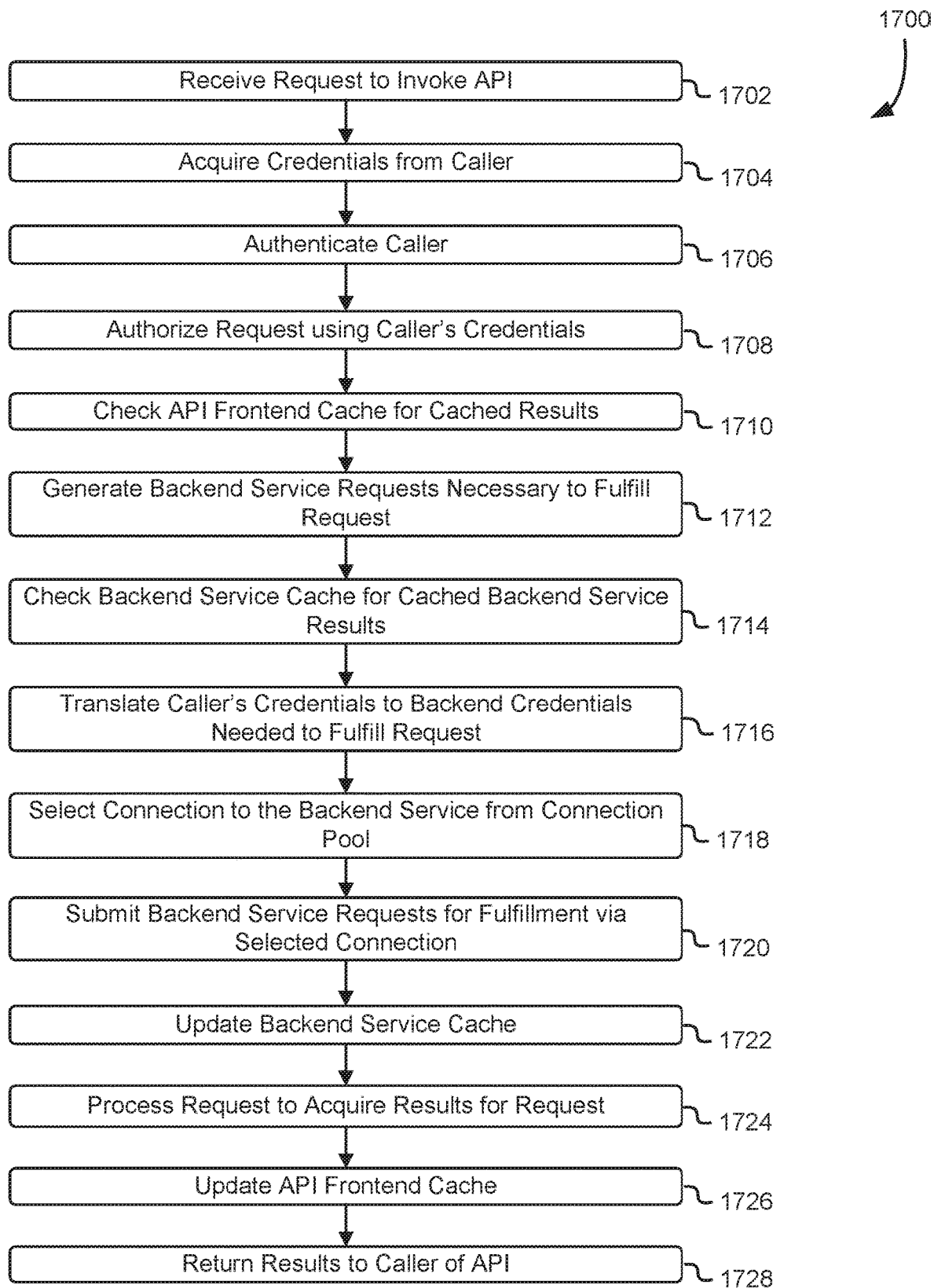
FIG. 17 shows an illustrative example of a process that, as a result of being performed by an API gateway service, fulfils a request submitted via an API.

FIG. 17 shows an illustrative example of a process that, as a result of being performed by an API gateway service, fulfils a request submitted via an API. A process diagram 1700 illustrates a process that begins at block 1702 with an API gateway service receiving a request to invoke an API. At block 1704, the API gateway acquires credentials from the caller for the purpose of authorizing the request. The credentials may be transmitted with the request, or may be provided to the API gateway as part of a session that includes a stream of API requests. The credentials may take the form of a username and password, cryptographic key, security token, digital signature, or digital certificate. The API gateway service examines the credentials to authenticate 1706 the identity of the caller. At block 1708, the API gateway examines a set of access controls that limit access to the API, and determines whether the credentials provided by the caller are sufficient to authorize the request. If the provided credentials are sufficient to authorize the request, execution proceeds to block 1710. If the provided credentials are not sufficient to authorize the request, the process stops and an error is returned to the caller.

At block 1710, the API gateway queries a frontend cache to determine whether the frontend cache includes an entry matching the received request. If the frontend cache contains an entry matching the received request, results for the request are retrieved from the frontend cache and returned to the caller. If the frontend cache does not contain an entry matching the received request, execution advances to block 1712.

The API gateway invokes the API, and the API generates 1712 a backend service request to be submitted to the backend service. In some examples, the backend service request is a SQL query to be submitted to a relational database server. The API queries 1714 a backend cache to determine whether the backend cache contains an entry matching the backend service request. If the backend cache contains an entry matching the backend service request, a result for the backend service request is extracted from the backend cache and returned to the API, and execution advances to block 1724. If the backend cache does not contain an entry matching the backend service request, execution advances to block 1716.

At block 1716, the API translates the API credentials supplied as part of the request to backend credentials necessary for accessing the backend service. In some examples, the API credentials may be translated using a credential-translation table that links API credentials to one or more backend credentials. In another example, backend credentials may be retained by the API and accessed as a consequence of being granted access to the API. In yet another example, the API uses a default credential to access the backend service. In yet another example, the API forwards the API credential to the backend service, and the backend service uses the API credential to authorize the backend request.

At block 1718, the API queries a connection pool to acquire an active connection to the backend service. If an active connection cannot be acquired from the connection pool, the API generates a new active connection to the backend service. The API submits 1720 the backend service request to the backend service via the active connection, and receives a corresponding set of backend service results. The active connection is placed in the active connection pool for later use. The backend service cache is updated 1722 using the backend service results.

At block 1724, the API processes the backend service results to generate API results to be returned to the caller. The frontend cache is updated 1726 using the API results, and expired cache entries are purged from the frontend cache. At block 1728, the API results are returned to the caller, and the invocation of the API is complete.

Figure 18:
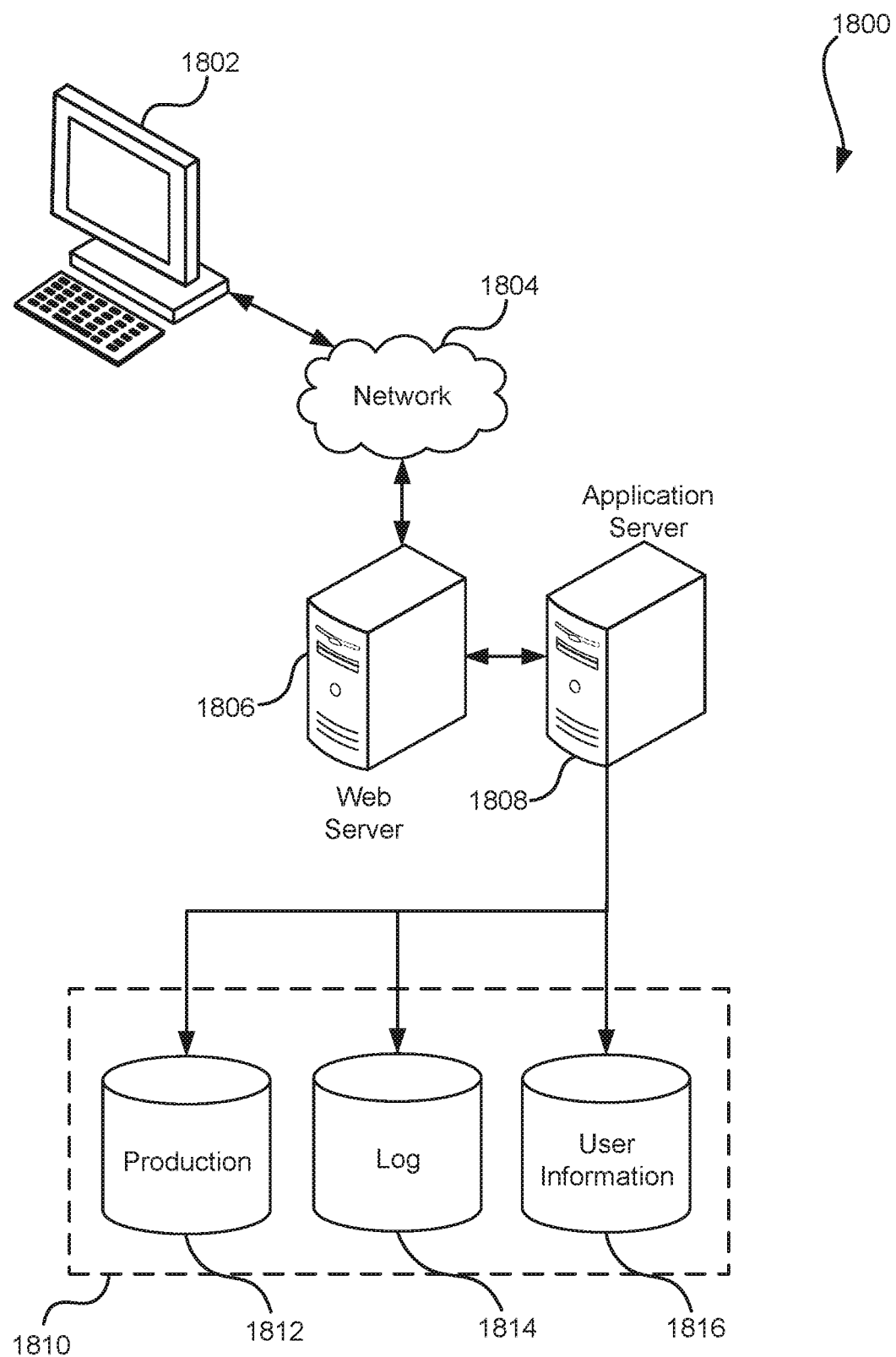
FIG. 18 illustrates an environment in which various embodiments can be implemented.

FIG. 18 illustrates aspects of an example environment 1800 for implementing aspects in accordance with various embodiments. As will be appreciated, although a web-based environment is used for purposes of explanation, different environments may be used, as appropriate, to implement various embodiments. The environment includes an electronic client device 1802, which can include any appropriate device operable to send and/or receive requests, messages, or information over an appropriate network 1804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1806 for receiving requests and serving content in response thereto, although for other networks an alternative device serving a similar purpose could be used as would be apparent to one of ordinary skill in the art.

The illustrative environment includes at least one application server 1808 and a data store 1810. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1802 and the application server 1808, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1810 can include several separate data tables, databases, data documents, dynamic data storage schemes, and/or other data storage mechanisms and media for storing data relating to a particular aspect of the present disclosure. For example, the data store illustrated may include mechanisms for storing production data 1812 and user information 1816, which can be used to serve content for the production side. The data store also is shown to include a mechanism for storing log data 1814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1810. The data store 1810 is operable, through logic associated therewith, to receive instructions from the application server 1808 and obtain, update, or otherwise process data in response thereto. The application server 1808 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 1802. Information for a particular item of interest can be viewed in a dedicated page or window of the browser. It should be noted, however, that embodiments of the present disclosure are not necessarily limited to the context of webpages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 18. Thus, the depiction of the system 1800 in FIG. 18 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSr") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGF") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

Note that the term "digital signature" includes any information usable to cryptographically verify authenticity of a message including information generated using an RSA-based digital scheme (such as RSA-PSS), the digital signature algorithm (DSA) and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

A mapping may be reversible, such that a data value may be converted from one format to another format of the application based at least in part on a map. As described herein a map may include a table, an algorithm, a set of operations, a deterministic function, or other mechanism suitable receiving an input and determining a corresponding output.

Information may be said to be programmatically unexportable if there is no legitimate way to programmatically cause (e.g., through an interface of the device) the device to provide the information). The information may be maintained, for example, such that there is no request mechanism (e.g., application programming interface (API) call) for causing hardware, with access to the information in plaintext form, to reveal the information in plaintext form. As an example, a device storing the information (e.g., cryptographic module) may be configured to lack an ability to provide a copy of some or all of its memory such that the copy includes the information in plaintext form. It should be noted however, that while information for which there is no legitimate way of obtaining the information in plaintext form is used throughout the disclosure for the purpose of illustration, some information may be maintained such that the information is obtainable through a limited number of authorized uses, which may require various security protocols to be employed and able to prevent unauthorized access to the information in plaintext form. Generally, programmatically unexportable information is information (e.g., one or more cryptographic keys) for which extraordinary measures must be taken to obtain the information in plaintext form, if it is possible at all to obtain the information in plaintext form.

In various embodiments, data objects such as digital certificates may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security. The key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). For example, an application may be provisioned with the private key and the data object may include a certificate for the private key for use by a system for verification of the digital signature of the data object. Other variations, including variations where a symmetric key shared between the user computer and the system that cryptographically verifies the data object can be used to encrypt and/or digitally sign the data object.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar references in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   generating, in response to a first request, an application programming interface (API) to perform a structured query language (SQL) operation associated with a relational database;
   generating a connection pool comprising a cache of a plurality of connections to a plurality of instances implementing a relational database, where a first connection of the plurality of connections corresponds to a first instance of the plurality of instances;
   obtaining, from a client application, a second request to invoke the API, wherein the second request comprises code that, as a result of being executed by an instance of the plurality of instances, produces a result of the SQL operation and a token that identifies the client application;
   invoking the API using at least the token and an API endpoint indicated by the second request;
   acquiring the first connection of the plurality of connections to the first instance of the plurality of instances based, at least in part, on state information associated with the first connection indicating that the first connection is an active connection of the connection pool;
   modifying the state information based, at least in part, on a result of acquiring the first connection and the second request;
   transmitting the second request including the code to the first instance over the first connection;
   obtaining the result of the SQL operation from the first instance over the first connection;
   returning the first connection to the connection pool by at least updating the state information; and
   providing the result of the SQL operation in response to the second request.

2. The computer-implemented method of claim 1, wherein generating the connection pool further comprises setting a total number of connections to be maintained within the connection pool.

3. The computer-implemented method of claim 2, wherein the computer-implemented method further comprises:
   determining that no active connections are available in the connection pool; and
   as a result of a number of connections of the connection pool being less than the total number of connections, generating the first connection.

4. The computer-implemented method of claim 3, wherein generating the first connection further comprises establishing a secure session layer connection between a first service to a second service.

5. The computer-implemented method of claim 1, wherein the state information is maintained during a lifetime of the first connection.

6. The computer-implemented method of claim 1, wherein acquiring the first connection of the plurality of connections further comprises:
   obtaining a history associated with the first connection;
   determining, based, at least in part, on the history, that previous code sent over the first connection match the code; and
   as a result, selecting the first connection.

7. The computer-implemented method of claim 6, wherein the previous code and the code include standard query language instructions.

8. A system, comprising:

one or more processors; and memory storing instructions that, as a result of being executed by the one or more processors, cause the system to:

generate an application programming interface (API) based at least in part on a first request, wherein the API is hosted by a first service to cause a second service to perform a structured query language (SQL) operation;

obtain, from a client application, a second request to invoke the API an, wherein the second request indicates an API endpoint;

invoke the API based, at least in part, on a token associated with the second request and the API endpoint, wherein the token comprises an API credential that identifies the client application;

create a first connection to the second service providing a relational database;

add the first connection to a connection pool maintained by the first service and update state information associated with the first connection and the application programming interface hosted by the first service;

acquire, from the connection pool maintained by the first service, he first connection between the first service and the second service;

transmit, over the first connection, a command that, as a result of being fulfilled by the second service, causes a relational database service to perform an operation included in the second request to generate a response; and provide the response to an endpoint associated with the second request.

9. The system of claim 8, wherein the operation further comprises executing a sequence of standard query language instructions by a second service providing a relational database as a stored procedure.

10. The system of claim 8, wherein the instructions that cause the system to acquire the first connection further includes instructions that, as a result of being executed, cause the system to select the first connection from the connection pool based, at least in part, on information included in the second request.

11. The system of claim 8, wherein the first connection is an encrypted communication session.

12. The system of claim 8, wherein the first connection is a transport layer security connection.

13. The system of claim 8, wherein data maintained in the relational database is encrypted.

14. The system of claim 8, wherein the first connection is acquired by at least selecting the first connection from the connection pool based, at least in part, on the first connection being recently used in response to a third request that was obtained prior to the second request.

15. A non-transitory computer-readable storage medium having stored thereon executable instructions that, as a result of being executed by one or more processors of a computer system, cause the computer system to:

generate an application programming interface (API) based at least in part on a first request, wherein the API is to cause an operation to be performed by a database;

generate a first connection to a first instance of the database;

add the first connection to a connection pool;

obtain, from a client application, a second request to invoke the API, an, wherein the second request indicates an API endpoint and comprises a token;

invoke the API based, at least in part, on the API endpoint and API credentials from the token;

authenticate the second request to cause the operation to be performed using at least the token;

acquire the first connection from the connection pool based at least in part on state information, where the state information is associated with an application programming interface hosted by the computer system;

provide the operation to the database over the first connection; and return the first connection to the connection pool.

16. The non-transitory computer-readable storage medium of claim 15, wherein instructions further include instructions that, as a result of being executed by the one or more processors, cause the computer system to:

determine that the first connection is unavailable;

generate a second connection to a second instance of the database; and add the second connection to the connection pool.

17. The non-transitory computer-readable storage medium of claim 15, wherein the instructions further comprise instructions that, as a result of being executed by the one or more processors, cause the computer system to receive, at an interface of a service, the second request and executable code that, as a result of being executed by the database, cause the database to perform the operation.

18. The non-transitory computer-readable storage medium of claim 15, wherein access to the application programming interface is limited based, at least in part, on the token.

19. The non-transitory computer-readable storage medium of claim 15, wherein the operation further comprises pre-compiled structure query language code.

20. The non-transitory computer-readable storage medium of claim 15, wherein the API endpoint is generated by an API service based at least in part on the first request.

* * * * *